US010545586B2

(12) United States Patent
Eguchi

(10) Patent No.: US 10,545,586 B2
(45) Date of Patent: *Jan. 28, 2020

(54) ELECTRONIC PEN

(71) Applicant: Wacom Co., Ltd., Saitama (JP)

(72) Inventor: Toru Eguchi, Chiba (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,277

(22) Filed: Jun. 25, 2019

(65) Prior Publication Data

US 2019/0310721 A1    Oct. 10, 2019

Related U.S. Application Data

(63) Continuation of application No. 15/640,057, filed on Jun. 30, 2017, now Pat. No. 10,379,640, which is a
(Continued)

(30) Foreign Application Priority Data

Jan. 29, 2015    (JP) .................................. 2015-015345

(51) Int. Cl.
   *G09G 5/00*    (2006.01)
   *G06F 3/02*    (2006.01)
   (Continued)

(52) U.S. Cl.
   CPC ........ *G06F 3/0383* (2013.01); *G06F 3/03545* (2013.01); *G06F 3/044* (2013.01); *G06F 3/046* (2013.01); *G06F 2203/04105* (2013.01)

(58) Field of Classification Search
   CPC .. G09G 5/00; G06F 3/02; G06F 3/041; G06F 3/045; G06F 3/042; G06F 3/043; G06K 11/06; G08C 21/00
   See application file for complete search history.

(56) References Cited

U.S. PATENT DOCUMENTS 6,985,138 B2 *   1/2006   Charlier ................ G06F 3/0312
                                                        178/19.01
8,913,041 B2    12/2014   Fukushima et al.
(Continued)

FOREIGN PATENT DOCUMENTS

EP        2 672 494 A1      12/2013
JP        2003-131797 A      5/2003
(Continued)

OTHER PUBLICATIONS

European Office Action, dated Feb. 26, 2019, for European Application No. 16 743 081.8-1216, 11 pages.
(Continued)

*Primary Examiner* — Pegeman Karimi
(74) *Attorney, Agent, or Firm* — Seed IP Law Group LLP

(57) ABSTRACT

An electronic pen configured to transmit signals to a sensor of a position detecting device includes a core body; a signal transmitter which transmits a signal for position detection and a signal including information about the electronic pen to the sensor of the position detecting device; and a protector which sets at least a tip of the core body between a protected state and an unprotected state. In response to at least the tip of the core body being in the unprotected state, the signal for position detection and the signal including the information are transmitted from the signal transmitter to the sensor of the position detecting device. In response to at least the tip of the core body being in the protected state, the signal for position detection is transmitted from the signal transmitter and the signal including the information is not transmitted from the signal transmitter.

21 Claims, 13 Drawing Sheets

Related U.S. Application Data continuation of application No. PCT/JP2016/050622, filed on Jan. 12, 2016.

(51) Int. Cl.
*G06F 3/038* (2013.01)
*G06F 3/0354* (2013.01)
*G06F 3/044* (2006.01)
*G06F 3/046* (2006.01)

(56) References Cited

U.S. PATENT DOCUMENTS

| | | | |
|---|---|---|---|
| 9,063,025 B2 | 6/2015 | Horie et al. | |
| 9,268,417 B2 | 2/2016 | Oda et al. | |
| 2007/0025805 A1* | 2/2007 | Lapstun | B43K 7/005 401/195 |
| 2011/0193826 A1 | 8/2011 | Liang | |
| 2011/0219892 A1 | 9/2011 | Fukushima et al. | |
| 2012/0256830 A1 | 10/2012 | Oda et al. | |
| 2013/0199311 A1 | 8/2013 | Horie et al. | |
| 2013/0207926 A1* | 8/2013 | Kremin | G06F 3/0383 345/174 |
| 2013/0329335 A1 | 12/2013 | Obata | |
| 2014/0085270 A1 | 3/2014 | Obata | |
| 2015/0247743 A1 | 9/2015 | Horie et al. | |
| 2015/0370354 A1* | 12/2015 | Stern | G06F 3/03545 345/173 |
| 2016/0132135 A1 | 5/2016 | Oda et al. | |
| 2016/0187217 A1 | 6/2016 | Horie et al. | |
| 2016/0188008 A1 | 6/2016 | Horie et al. | |

FOREIGN PATENT DOCUMENTS

| | | |
|---|---|---|
| JP | 2011-18090 A | 1/2011 |
| JP | 2011-186803 A | 9/2011 |
| JP | 2012-221304 A | 11/2012 |
| JP | 2013-161307 A | 8/2013 |
| JP | 2014-067265 A | 4/2014 |

OTHER PUBLICATIONS

Extended European Search Report, dated Jul. 16, 2018, for European Application No. 16743081.8-1216, 20 pages.

International Search Report, dated Mar. 22, 2016, for corresponding International Application No. PCT/JP2016/050622, 4 pages.

Partial Supplementary European Search Report, dated Mar. 13, 2018, for European Application No. 16743081.8-1216 / 3252570, 24 pages.

Japanese Office Action, dated Aug. 14, 2019, for Japanese Application No. 2016-145006, 8 pages. (with English translation).

* cited by examiner

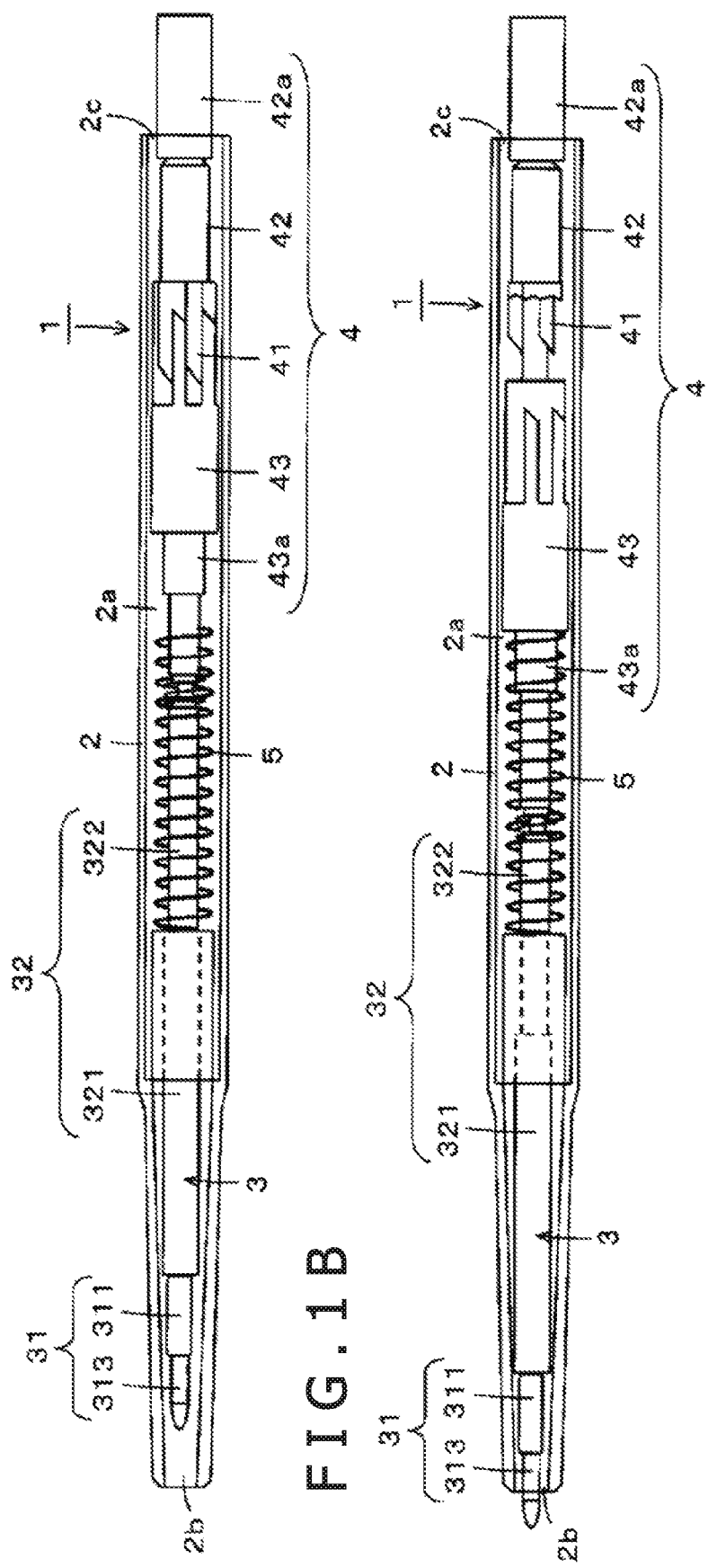

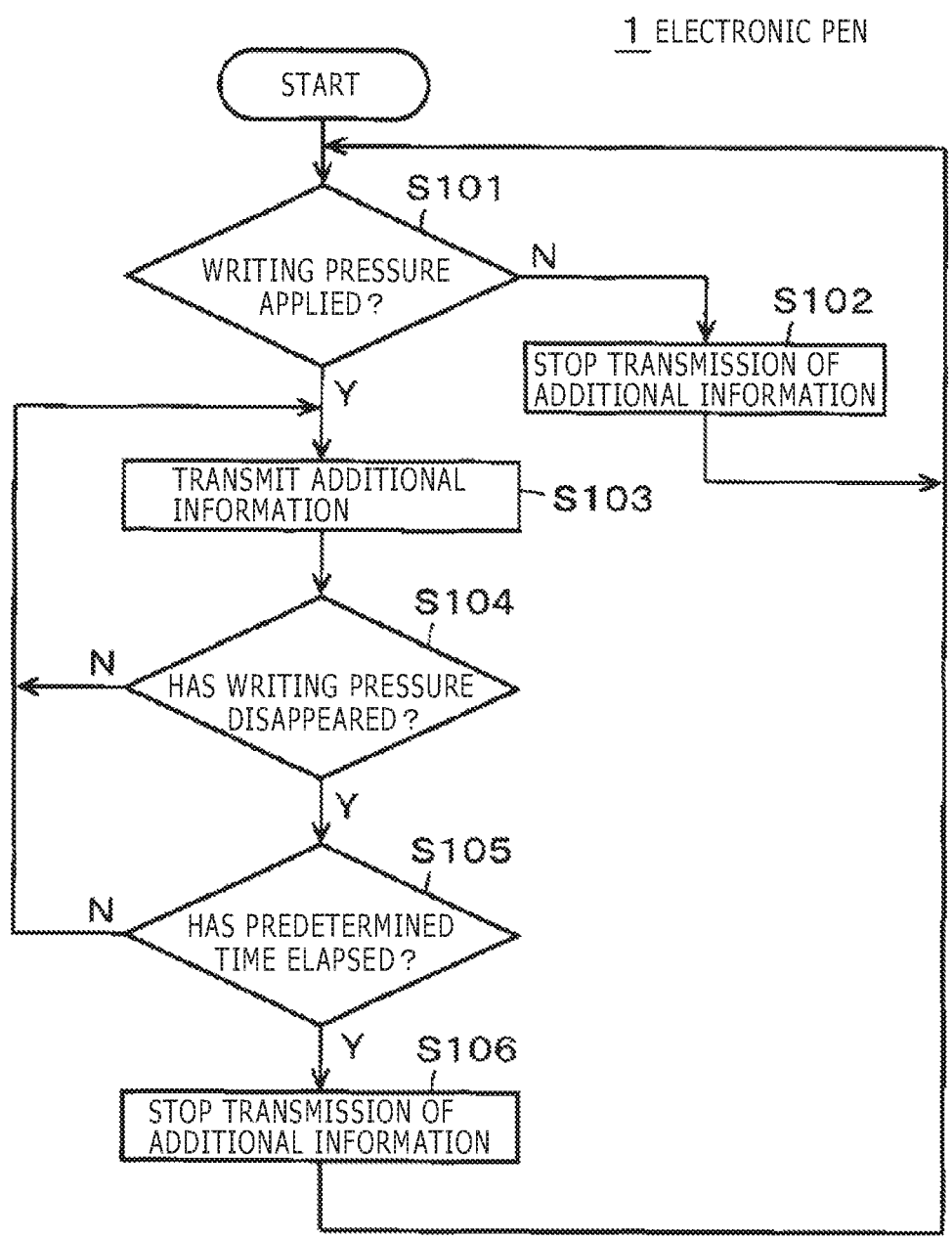

SECTIONAL VIEW ALONG A-A

ELECTRONIC PEN

BACKGROUND

Technical Field

The present invention relates to an electronic pen that is a pen-type position indicator used with a position detecting device.

Description of the Related Art

The electronic pen is held by a user and is used for position indication over a sensor of a position detecting device. The indicated position over the sensor by the electronic pen is detected by the position detecting device through transfer of a signal for position detection between the electronic pen and the sensor based on various coupling systems, such as the electromagnetic induction coupling system and the capacitive coupling system.

In recent years, between the electronic pen and the position detecting device, additional information, such as writing pressure data and identification information of the electronic pen, has come to be transferred besides the signal for position detection. For example, see Patent Document 1 (Japanese Patent Laid-Open No. 2014-67265).

PRIOR ART DOCUMENT

Patent Document

Patent Document 1: Japanese Patent Laid-Open No. 2014-67265

BRIEF SUMMARY

Technical Problems

Identification information and so forth as additional information of an electronic pen is information that should be kept secret, if possible, and is information for which security management is desired, if possible. Furthermore, the additional information is information that should be sent out to a position detecting device when a user is carrying out position indication operation over a sensor by the electronic pen, and should not be unnecessarily transmitted, if possible. However, in the past, the additional information, in general, is simultaneously sent out with a signal for position detection. Accordingly, there has been a problem that no consideration is made about ensuring security of the additional information and transmission only at a time of need.

Furthermore, the recent electronic pens have been decreasing in thickness in consideration of being mounted on small-size portable equipment, such as a mobile phone terminal, in which a position detecting device is incorporated. Along with this thickness reduction of the electronic pen, thickness reduction is being promoted also in the core body that is incorporated in the electronic pen and forms the pen tip.

Normally, the core body is attached such that its tip protrudes from one opening of a tubular chassis of the electronic pen. As a result, the core body becomes vulnerable to a shock due to its thickness reduction, and there is a possibility that the core body gets broken or distorted when the electronic pen is dropped. Moreover, recently there are cases in which the material of the core body is made of felt. However, this felt is obtained by bundling and bonding fibers and, therefore, the strength is slightly low. Thus, the bundle of fibers often breaks up when an excessive force, such as a shock due to a drop, is applied to the core body. In particular, the core body made of felt is vulnerable to a large force in a direction perpendicular to the core axis. Therefore, it is important to protect the core body when the electronic pen is not being used.

In view of the above-described problems, the present invention, in one or more embodiments, intends to provide an electronic pen configured to be capable of simultaneously solving problems of ensuring of security of additional information and avoidance of unnecessary transmission and protection of a core body.

Technical Solution

In order to solve the above-described problems, an embodiment of the invention provides an electronic pen that transmits a signal to a sensor of a position detecting device, and is characterized by including a core body, a signal transmitter or transmitting unit that transmits a signal to the sensor, a protector or a protection mechanism that sets at least a tip of the core body to a state of not being exposed to an external environment to protect at least the tip of the core body, and a detector or detecting means that detects whether or not at least the tip of the core body is in a state of being protected by the protection mechanism. Based on a detection result of the detecting means, a signal for position detection and a signal including additional information that is to be transmitted to the position detecting device when position indication operation is carried out over the sensor are allowed to be transmitted from the signal transmitting unit when at least the tip of the core body is not protected by the protection mechanism and is exposed to the external. Further, the signal including the additional information is precluded from being transmitted when at least the tip of the core body is protected by the protection mechanism.

According to the electronic pen in accordance with an embodiment of the invention with the above-described configuration, the core body can be protected by the protection mechanism as the core body does not protrude to the external when this electronic pen is not used. Thus, the core body can be protected from shock of a drop or the like.

Furthermore, when it is detected by the detecting means that the tip of the core body is protected by the protection mechanism, the additional information is precluded from being sent out based on the detection result. Moreover, when it is detected by the detecting means that the protection of the tip of the core body by the protection mechanism is released, the additional information is allowed to be transmitted.

Advantageous Effect

According to the electronic pen in accordance with one or more embodiments of the present invention, the transmission of the additional information is precluded when the tip of the core body is protected by the protection mechanism, and the transmission of the additional information is allowed when the protection of the tip of the core body by the protection mechanism is released. This can provide an electronic pen configured to be capable of simultaneously solving problems of ensuring of security of the additional information, avoidance of unnecessary transmission of the additional information, and protection of the core body.

BRIEF DESCRIPTION OF THE SEVERAL VIEWS OF THE DRAWINGS

FIGS. 1A and 1B depict diagrams showing a configuration example of a first embodiment of an electronic pen according to one aspect of the present invention.

FIG. 4 is a diagram showing a flowchart for explaining operation of the major part of the first embodiment of the electronic pen according to one aspect of the present invention.

DETAILED DESCRIPTION

Figure 2A:
FIGS. 2A, 2B, and 2C depict diagrams for explaining a configuration example of an electronic pen cartridge used in the first embodiment of the electronic pen according to one aspect of the present invention.

Several embodiments of an electronic pen according to several aspects of the present invention will be described below with reference to the drawings.

First Embodiment

FIGS. 1A and 1B depict diagrams showing a configuration example of a first embodiment of the electronic pen according to an aspect of the present invention. An electronic pen 1 of the first embodiment has a knock-type configuration in which an electronic pen cartridge 3 that forms an electronic pen main body unit is housed in a hollow part 2a of a tubular chassis 2 and a pen tip of the electronic pen cartridge 3 is protruded and retracted from the side of an opening 2b at one end of the chassis 2 in the longitudinal direction by a knock cam mechanism unit 4. The knock cam mechanism unit 4 forms a protection mechanism in this example.

FIG. 1A shows the state in which the entire electronic pen cartridge 3, including the pen tip side (tip of a pen tip part 313 of a core body unit 31 to be described later) of the electronic pen cartridge 3, is housed in the hollow part 2a of the chassis 2, and the pen tip is protected by the protection mechanism. FIG. 1B shows the state in which at least the tip of the pen tip of the electronic pen cartridge 3 protrudes from the opening 2b of the chassis 2 by the knock cam mechanism unit 4, and the protection by the protection mechanism is released. The examples of FIGS. 1A and 1B are shown as the state in which the chassis 2 of the electronic pen 1 is composed of a transparent synthetic resin and the inside thereof is see-through.

The electronic pen 1 of the present embodiment is configured to ensure compatibility with a commercially-available knock-type ballpoint pen. Specifically, the chassis 2 and the knock cam mechanism unit 4 provided in this chassis 2 have the same configuration as a well-known commercially-available knock-type ballpoint pen, and the dimensional relationship is also configured identically. In other words, it is also possible to use the chassis and the knock cam mechanism unit of the commercially-available knock-type ballpoint pen as they are as the chassis 2 and the knock cam mechanism unit 4. Furthermore, for the electronic pen cartridge 3, compatibility with a refill 6 of a ballpoint pen is ensured as will be described later. The electronic pen cartridge 3 has a configuration in which the electronic pen cartridge 3 is housed in the chassis 2 instead of the refill 6 (see FIG. 2A) of a ballpoint pen and the pen tip can protrude and retract based on a knock system by the knock cam mechanism unit 4.

As shown in FIGS. 1A and 1B, the knock cam mechanism unit 4 has a well-known configuration in which a cam main body 41, a knock bar 42, and a rotary element 43 are combined. The cam main body 41 is formed on the inner wall surface of the tubular chassis 2. An end part 42a of the knock bar 42 is made to protrude from an opening 2c on the opposite side to the pen tip side of the chassis 2 so that a knock operation by a user can be accepted. The rotary element 43 has a fitting part 43a to which an end part of the electronic pen cartridge 3 on the opposite side to the pen tip side is fitted.

When the end part 42a of the knock bar 42 is pressed down in the state of FIG. 1A, the electronic pen cartridge 3 is locked into the state of FIG. 1B in the chassis 2 by the knock cam mechanism unit 4, which provides the state in which the pen tip side of the electronic pen cartridge 3 protrudes from the opening 2b of the chassis 2. Then, when the end part 42a of the knock bar 42 is pressed down again from this state of FIG. 1B, the locked state is released by the knock cam mechanism unit 4 and the position of the electronic pen cartridge 3 in the chassis 2 returns to the state of FIG. 1A by a return spring 5. The detailed configuration of the knock cam mechanism unit 4 and the operation thereof are well known and therefore description thereof is omitted here.

[Embodiment of Electronic Pen Cartridge]

Figure 2B:
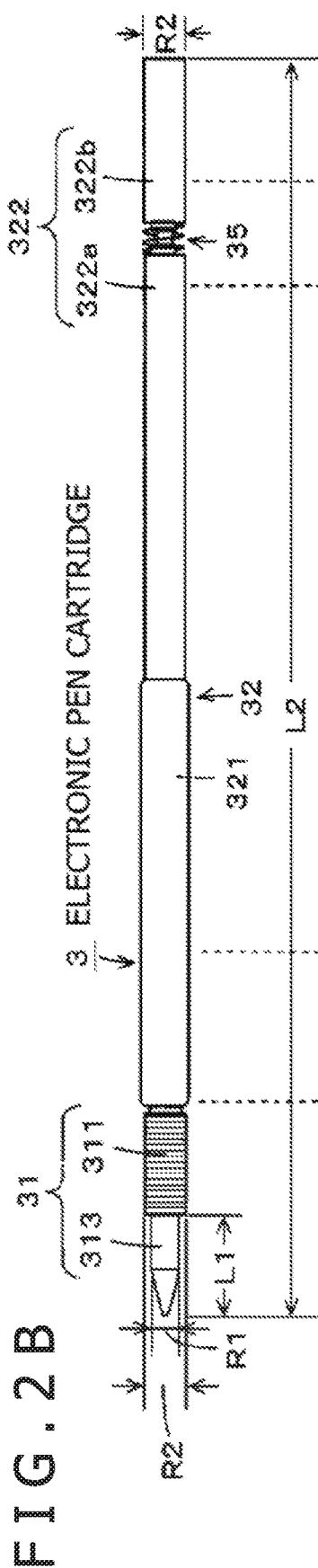
Figure 2C:
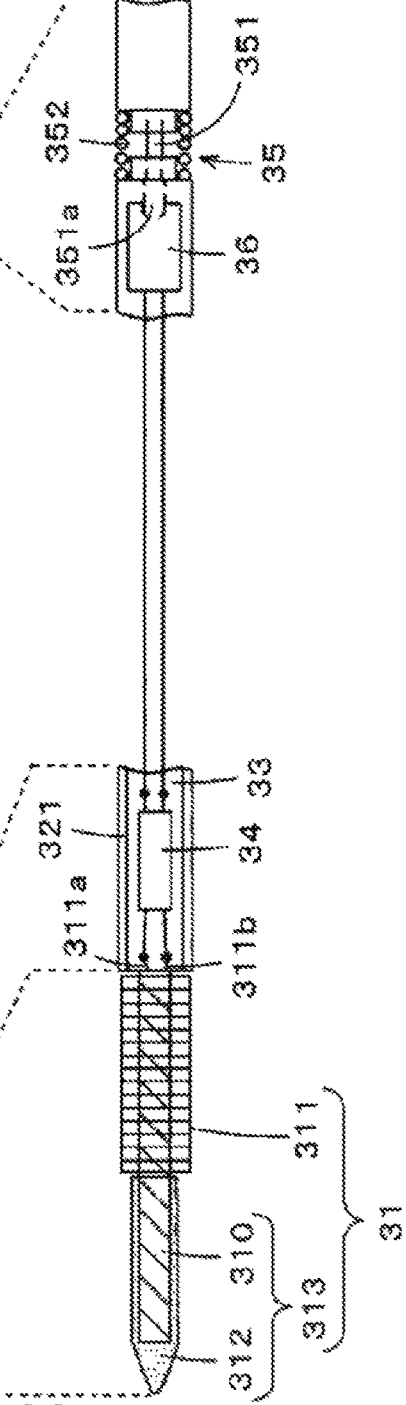

FIGS. 2A, 2B, and 2C depict diagrams showing a configuration example of the electronic pen cartridge 3 with comparison with a refill of a commercially-available knock-type ballpoint pen. Specifically, FIG. 2A shows the refill 6 of the commercially-available knock-type ballpoint pen, and FIG. 2B shows a configuration example of the electronic pen cartridge 3 of the present embodiment. Furthermore, FIG. 2C is a diagram for explaining the configuration of the major parts of the electronic pen cartridge 3 of the present embodiment shown in FIG. 2B.

As shown in FIG. 2A, the refill 6 of the commercially-available knock-type ballpoint pen has a well-known configuration in which a pen tip part 61 in which a ball is disposed at the tip and an ink storage 62 are joined at a joint part 63 and are integrated. The joint part 63 has the same diameter as the ink storage 62.

On the other hand, the electronic pen cartridge 3 of the present embodiment has a configuration in which the core body unit 31 and a tubular body unit 32 are joined to be integrated as shown in FIG. 2B. As shown in FIG. 2C, the core body unit 31 has a configuration in which a coil 311 is wound partly around a magnetic core, specifically a ferrite core 310 in this example, and the part thereof around which the coil 311 is not wound is covered by a protective material 312 to form the pen tip part 313.

In this example, in the core body unit 31, the coil 311 is wound around a part with approximately half length of the total length of the ferrite core 310 from the vicinity of one end part of the ferrite core 310. Furthermore, in this example, the remaining part with approximately half length in the ferrite core 310, around which the coil 311 is not wound, is covered by the protective material 312 that is composed of, for example, a resin and is used as the pen tip part 313. In one embodiment, a resin material that is comparatively hard and has elasticity, such as polyoxymethylene (POM), is used for the protective material 312 of the pen tip part 313.

In this case, as shown in FIG. 2A and FIG. 2B, the configuration is so made such that the diameter and length of the pen tip part 313 of the core body unit 31 of the electronic pen cartridge 3 are substantially equal to diameter R1 and length L1 of the pen tip part 61 of the refill 6 of the ballpoint pen. Furthermore, the configuration is so made such that the diameter of the part around which the coil 311 is wound in the core body unit 31 of the electronic pen cartridge 3 is substantially equal to diameter R2 (R2>R1) of the ink storage 62 of the refill 6 of the ballpoint pen.

Furthermore, the tubular body unit 32 is composed of a first tubular body unit 321 in which electronic circuit components are disposed, and a second tubular body unit 322 in which components for writing pressure detection are disposed. Moreover, as shown in FIGS. 2A and 2B, the length (total length) in the state in which the core body unit 31 and the tubular body unit 32 are joined is selected to be equal to total length L2 of the refill 6 of the ballpoint pen.

A printed board 33 is disposed in the first tubular body unit 321 of the tubular body unit 32 as shown in FIG. 2C. In addition, an electronic circuit 34 including a capacitor that forms a resonant circuit with the coil 311, a memory that stores identification information (identification (ID)) forming part of additional information that should be sent out to a position detecting device when a user is carrying out position indication operation over the sensor by the electronic pen, an integrated circuit (IC), and so forth are provided on the printed board 33.

Furthermore, the core body unit 31 and the first tubular body unit 321 of the tubular body unit 32 are joined to be integrally configured in the state in which part of the ferrite core 310 of the core body unit 31 is inserted in the first tubular body unit 321, for example. In this case, in the joining between the core body unit 31 and the first tubular body unit 321 of the tubular body unit 32, a winding start end 311a and a winding finish end 311b of the coil 311 are electrically connected to one end and the other end of the capacitor provided in the electronic circuit 34 in the first tubular body unit 321.

In this example, the second tubular body unit 322 is formed of a tubular body with the diameter substantially equal to the diameter R2 of the ink storage 62 of the refill 6 of the commercially-available ballpoint pen. In the example of FIG. 2B, the second tubular body unit 322 is divided into two parts of a longer part 322a and a shorter part 322b, and a writing pressure detecting member 36 is provided near a joint part 35 of them.

Specifically, as shown in FIG. 2C, the longer part 322a and the shorter part 322b are joined at the joint part 35 with the intermediary of a linking bar member 351 and a coil spring 352 in this example. In this case, the longer part 322a and the shorter part 322b are always elastically displaced to be separated from each other in the axial center direction by the coil spring 352. However, the longer part 322a and the shorter part 322b are configured to be locked at predetermined positions by the linking bar member 351 so as not to be displaced in the axial center direction beyond the positions. Furthermore, the configuration is made such that the total length of the electronic pen cartridge 3 in the locked state is substantially equal to the total length L2 of the refill 6 of the above-described ballpoint pen.

Moreover, as shown in FIG. 2C, the writing pressure detecting member 36 is provided in the longer part 322a in the present embodiment. Furthermore, the configuration is so made such that the side of one end 351a of the linking bar member 351 works as a pressing part of the writing pressure detecting member 36.

The writing pressure detecting member 36 of this example can employ a configuration of a variable-capacitance capacitor that uses writing pressure detecting means with a well-known configuration described in a Patent Document: Japanese Patent Laid-Open No. 2011-186803, for example, and whose capacitance changes according to the writing pressure. It is also possible to employ a configuration using a semiconductor element that allows the capacitance to vary according to the writing pressure like one disclosed in Japanese Patent Laid-Open No. 2013-161307, for example.

When pressure is applied to the core body unit 31 in the state in which the electronic pen cartridge 3 is housed in the chassis 2, a force from the pressure causes the longer part 322a of the electronic pen cartridge 3 to move to the side of the shorter part 322b against the elastic force of the coil spring 352, and the capacitance of the writing pressure detecting member 36 changes according to the writing pressure.

The electronic pen cartridge 3 with the above configuration is housed in the chassis 2 by fitting the shorter part 322b of the tubular body unit 32 of the electronic pen cartridge 3 to the fitting part 43a of the rotary element 43 of the knock cam mechanism unit 4. In this state, the whole of the electronic pen cartridge 3, including the core body unit 31 thereof, is housed in the chassis 2, and the core body unit 31 of the electronic pen cartridge 3 is protected.

Furthermore, in the electronic pen 1 of the present embodiment, when using the electronic pen 1 with a position detecting device, the user presses down the end part 42a of the knock bar 42 to protrude the tip of the pen tip part 313 of the core body unit 31 from the opening 2b of the chassis 2 as shown in FIG. 1B. As a result, the protection of the core body unit 31 of the electronic pen cartridge 3 is released. Then, when the use of the electronic pen 1 ends, the user presses down the end part 42*a* of the knock bar 42 again to house the whole of the electronic pen cartridge 3 in the hollow part 2*a* of the chassis 2 as shown in FIG. 1A and protect the core body unit 31.

[Circuit Configuration of Electronic Pen 1 and Circuit Configuration of Position Detecting Device Used with Electronic Pen 1]

Figure 3:
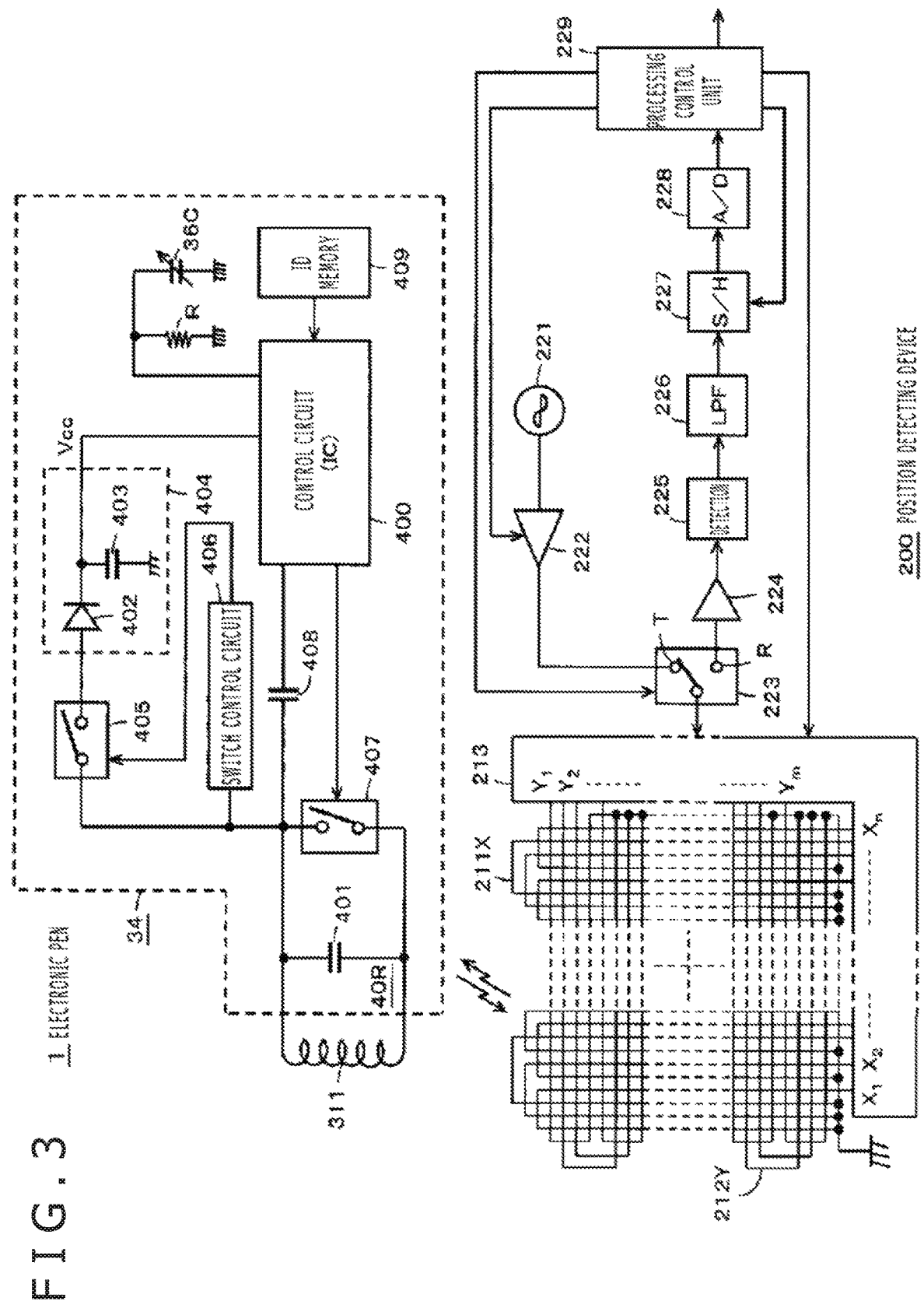
FIG. 3 is a diagram showing a configuration example of an electronic circuit of the first embodiment of the electronic pen according to one aspect of the present invention with a circuit configuration example of a position detecting device.

FIG. 3 shows a circuit configuration example of the electronic circuit 34 of the electronic pen 1, and a circuit configuration example of a position detecting device 200 that carries signal transfer based on electromagnetic induction coupling with the electronic pen 1.

In the present embodiment, the electronic pen 1 is configured to make electromagnetic induction coupling with conductors of a sensor of the position detecting device 200 to thereby transfer a signal for position detection and transmit, to the position detecting device 200, writing pressure information detected through the writing pressure detecting member 36, and identification information (ID) of the electronic pen 1 itself or identification information (ID) of the electronic pen cartridge 3.

Specifically, in the electronic circuit 34 of the electronic pen cartridge 3, a capacitor 401 is connected in parallel to the coil 311 and a parallel resonant circuit 40R is formed.

Furthermore, the electronic circuit 34 includes a control circuit 400 that controls transmission of additional information as shown in FIG. 3. In this example, the control circuit 400 is formed as an IC. The IC that forms the control circuit 400 is configured to operate by a supply voltage Vcc obtained by rectifying an alternate current (AC) signal received in the parallel resonant circuit 40R from the position detecting device 200 by electromagnetic coupling in a rectifying circuit (power supply circuit) 404 composed of a diode 402 and a capacitor 403.

Furthermore, in this example, a switch circuit 405 set to the open state normally (normal open) is provided between the parallel resonant circuit 40R and the power supply circuit 404. The switch circuit 405 is formed of a semiconductor switch circuit, for example, and is in the high-impedance state in the open state.

The switch circuit 405 is controlled to be turned on by a switch control signal from a switch control circuit 406. The switch control circuit 406 generates the switch control signal from the AC signal received in the parallel resonant circuit 40R from the position detecting device 200 by electromagnetic coupling.

Furthermore, in the electronic circuit 34, a switch circuit 407 is connected in parallel to the parallel resonant circuit 40R composed of the coil 311 and the capacitor 401. The switch circuit 407 is configured to be on/off-controlled by the control circuit 400. An electromagnetic induction signal transmitted from the position detecting device 200 to the control circuit 400 is supplied through a capacitor 408 as a synchronization signal for transfer of the electromagnetic induction signal between the electronic pen 1 and the position detecting device 200.

In the present embodiment, as shown in FIG. 3, a variable-capacitance capacitor 36C of the writing pressure detecting member 36 is connected to the control circuit 400. A resistor R is connected in parallel to the variable-capacitance capacitor 36C. In this example, the control circuit 400 discharges the variable-capacitance capacitor 36C through the resistor R after charging the variable-capacitance capacitor 36C, and measures the time that elapses for the voltage of the terminal in which the variable-capacitance capacitor 36C is connected (equivalent to the voltage across the variable-capacitance capacitor 36C) to become a predetermined threshold. Thereby, the control circuit 400 measures the capacitance of the variable-capacitance capacitor 36C.

Then, the control circuit 400 detects change in the writing pressure from change in the measured capacitance of the variable-capacitance capacitor 36C and detects whether a writing pressure is applied to the electronic pen cartridge 3. In addition, when detecting that a writing pressure is applied, the control circuit 400 calculates the writing pressure value from the value of the capacitance of the variable-capacitance capacitor 36C.

Furthermore, in the present embodiment, the control circuit 400 transmits information on the calculated writing pressure value (writing pressure data) to the position detecting device 200 as a digital signal of plural bits by on/off-controlling the switch circuit 407. In the present embodiment, the writing pressure data forms part of additional information.

Moreover, in this example, an ID memory 409 that stores identification information (ID) including the manufacturer number and product number of the electronic pen 1 or the electronic pen cartridge 3 is connected to the control circuit 400. Furthermore, the control circuit 400 reads out the identification information stored in the ID memory 409 and on/off-controls the switch circuit 407 to transmit the identification information to the position detecting device 200 as a digital signal of plural bits. In the present embodiment, this identification information also forms part of additional information.

In the present embodiment, the control circuit 400 detects whether or not the tip of the pen tip part 313 of the core body unit 31 of the electronic pen cartridge 3 is protected, and carries out control to send out additional information only in the state in which the tip is not protected. In the present embodiment, the control circuit 400 detects whether or not the tip of the pen tip part 313 of the core body unit 31 of the electronic pen cartridge 3 is protected based on whether or not it is detected, by the writing pressure detecting member 36, that a writing pressure is applied.

Specifically, in the protected state in which the entire electronic pen cartridge 3 is housed in the chassis 2, the tip of the pen tip part 313 of the core body unit 31 of the electronic pen cartridge 3 does not protrude to the external, and, thus, a writing pressure is not applied to the core body unit 31. On the other hand, in the state in which the knock bar of the knock cam mechanism unit 4 has been operated and the protected state has been released, in which the tip of the pen tip part 313 of the core body unit 31 of the electronic pen cartridge 3 protrudes to the external from the opening 2*b* of the chassis 2, it is possible that a writing pressure is applied to the core body unit 31, and the state in which a writing pressure is actually applied is the state in which the electronic pen 1 is used by a user. Furthermore, in this example, when the writing pressure value increases by a predetermined threshold or larger from the state in which a writing pressure is not applied, the control circuit 400 detects it and determines that application of a writing pressure has been started.

As described above, in the control circuit 400, it can be detected whether or not the tip of the pen tip part 313 of the core body unit 31 of the electronic pen cartridge 3 is protected by detecting whether or not application of a writing pressure has been started. Specifically, in the present embodiment, the writing pressure detecting means also has a function as detecting means for detecting whether or not the tip of the pen tip part 313 of the core body unit 31 of the electronic pen cartridge 3 is protected.

In the present embodiment, when detecting that application of a writing pressure has not been started, the control circuit 400 always keeps the switch circuit 407 is in the off-state to provide the state in which the parallel resonant circuit 40R always works. Furthermore, when detecting that application of a writing pressure has been started, the control circuit 400 transmits writing pressure data and identification information to the position detecting device 200 as an amplitude shift keying (ASK)-modulated signal, as described will be later, by on/off-controlling the switch circuit 407 at timings based on the synchronization signal from the position detecting device received through the capacitor 408. The data and information may be modulated to an on off keying (OOK) signal instead of the ASK modulation.

In the position detecting device 200, as shown in FIG. 3, an X-axis direction loop coil group 211X and a Y-axis direction loop coil group 212Y are stacked and a position detecting coil is formed. For example, the respective loop coil groups 211X and 212Y are composed of n and m, respectively, rectangular loop coils. The respective loop coils configuring the respective loop coil groups 211X and 212Y are disposed to be lined up at equal intervals and sequentially overlap with each other.

Furthermore, in the position detecting device 200, a selection circuit 213 to which the X-axis direction loop coil group 211X and the Y-axis direction loop coil group 212Y are connected is provided. The selection circuit 213 sequentially selects one loop coil in the two loop coil groups 211X and 212Y.

Moreover, the position detecting device 200 includes an oscillator 221, a current driver 222, a switching connecting circuit 223, a receiving amplifier 224, a detection circuit 225, a low-pass filter 226, a sample/hold circuit 227, an analog to digital (A/D) conversion circuit 228, and a processing control unit 229. In one embodiment, the processing control unit 229 is a microcomputer.

The oscillator 221 generates an AC signal with a frequency f0. Furthermore, the AC signal generated in the oscillator 221 is supplied to the current driver 222. The current driver 222 converts the AC signal supplied from the oscillator 221 to a current and sends out the current to the switching connecting circuit 223. Based on control from the processing control unit 229, the switching connecting circuit 223 switches the connection target (transmitting-side terminal T, receiving-side terminal R) to which the loop coil selected by the selection circuit 213 is connected. In these connection targets, the transmitting-side terminal T and the receiving-side terminal R are connected to the current driver 222 and the receiving amplifier 224, respectively.

An induced voltage generated in the loop coil selected by the selection circuit 213 is sent to the receiving amplifier 224 via the selection circuit 213 and the switching connecting circuit 223. The receiving amplifier 224 amplifies the induced voltage supplied from the loop coil and sends out the amplified voltage to the detection circuit 225.

The detection circuit 225 detects the induced voltage generated in the loop coil, i.e., the received signal, and sends out the received signal to the low-pass filter 226. The low-pass filter 226 has a cutoff frequency sufficiently lower than the above-described frequency f0 and converts the output signal of the detection circuit 225 to a direct current (DC) signal to send out the DC signal to the sample/hold circuit 227. The sample/hold circuit 227 holds a voltage value at predetermined timing of the output signal of the low-pass filter 226, specifically at predetermined timing in the reception period, and sends out the voltage value to the A/D conversion circuit 228. The A/D conversion circuit 228 converts the analog output of the sample/hold circuit 227 to a digital signal and outputs the digital signal to the processing control unit 229.

The processing control unit 229 controls selection of the loop coil in the selection circuit 213, switching by the switching connecting circuit 223, and the timing of the sample/hold circuit 227. The processing control unit 229 causes an electromagnetic induction signal to be transmitted from the X-axis direction loop coil group 211X and the Y-axis direction loop coil group 212Y with a certain transmission continuation time based on an input signal from the A/D conversion circuit 228.

In each loop coil of the X-axis direction loop coil group 211X and the Y-axis direction loop coil group 212Y, an induced voltage is generated by an electromagnetic induction signal transmitted from the electronic pen 1. The processing control unit 229 calculates the coordinate value of the position indicated by the electronic pen 1 in the X-axis direction and the Y-axis direction based on the level of the voltage value of this induced voltage generated in each loop coil.

Furthermore, the processing control unit 229 supplies a signal for intermittence control of a transmission signal and a signal for control of the level of the transmission signal to the current driver 222, and executes reception processing of additional information, such as writing pressure data and identification information from the electronic pen 1. As described later, the processing control unit 229 detects an intermittent signal formed of an ASK signal from the electronic pen 1 as a digital signal of plural bits and detects additional information, such as writing pressure data and identification information.

[Operation of Electronic Pen 1 and Operation of Position Detecting Device 200]

Position detection operation and transmission and reception of additional information between the electronic pen 1 and the position detecting device 200 will be described below.

The position detecting device 200 sends out an AC signal of a transmission signal based on processing control of the processing control unit 229. In the electronic pen 1, when the electronic pen 1 is not in the state in which the AC signal from the position detecting device 200 is received by the parallel resonant circuit 40R, the switch circuit 405 is in the off-state and the supply voltage Vcc is not supplied from the power supply circuit 404. In this state, the control circuit 400 stops operation and the switch circuit 407 is set to the off-state.

Therefore, the electronic pen 1 is in the state in which the AC signal from the position detecting device 200 can be received in the parallel resonant circuit 40R. Furthermore, when the electronic pen 1 is brought above the sensor of the position detecting device 200 by a user, the electronic pen 1 becomes the state in which the parallel resonant circuit 40R of the electronic pen 1 can receive the AC signal from the position detecting device 200 by electromagnetic induction coupling irrespective of whether or not the electronic pen cartridge 3 is in the protected state.

Along with this, the switch control circuit 406 of the electronic circuit 34 of the electronic pen 1 generates the switch control signal that turns on the switch circuit 405 from the AC signal received by the parallel resonant circuit 40R from the sensor of the position detecting device 200. When the switch circuit 405 is turned on due to this, the supply voltage Vcc generated by rectifying the AC signal received by the parallel resonant circuit 40R is supplied from the power supply circuit 404 to the control circuit 400.

When the supply voltage Vcc is supplied, the control circuit 400 starts operation. FIG. 4 is a flowchart for explaining processing operation of the control circuit 400 of the electronic circuit 34 of the electronic pen 1.

First, the control circuit 400 monitors change in the capacitance of the variable-capacitance capacitor 36C of the writing pressure detecting member 36 and determines whether or not a writing pressure is applied through the pen tip part 313 of the core body unit 31 of the electronic pen cartridge 3 (step S101). When it is determined in the step S101 that a writing pressure is not applied, the control circuit 400 makes the state in which transmission of additional information is stopped and keeps the switch circuit 407 at the off-state constantly (step S102). After the step S102, the control circuit 400 returns the processing to the step S101 and repeats the processing of the step S101 and the subsequent steps.

In addition, as described above, the state in which a writing pressure is applied is not obtained when the electronic pen cartridge 3 is all housed in the chassis 2 and is in the protected state. Thus, the state of the step S102 includes a time when the electronic pen cartridge 3 is in this protected state.

Application of a writing pressure becomes possible when the end part 42a of the knock bar 42 of the knock cam mechanism unit 4 is pressed down by the user and the tip of the pen tip part 313 of the core body unit 31 of the electronic pen cartridge 3 becomes the state in which the protected state is released and the tip protrudes from the opening 2b of the chassis 2.

When it is determined that a writing pressure is applied in the step S101, the control circuit 400 starts transmission of additional information (step S103). Specifically, the control circuit 400 calculates a writing pressure value from the measurement result of the capacitance of the variable-capacitance capacitor 36C formed of the writing pressure detecting member 36 and generates writing pressure data. Then, the control circuit 400 on/off-controls the switch circuit 407 according to the generated writing pressure data to thereby transmit the writing pressure data as part of the additional information from the electronic pen 1 to the position detecting device 200.

Furthermore, in the step S103, the control circuit 400 reads out identification information of the electronic pen 1 or the electronic pen cartridge 3 from the ID memory 409 and on/off-controls the switch circuit 407 according to the read-out identification information to thereby transmit the identification information as part of the additional information from the electronic pen 1 to the position detecting device 200.

Specifically, when the switch circuit 407 is in the off-state, the parallel resonant circuit 40R can carry out a resonance operation in response to an AC signal transmitted from the position detecting device 200 and return an electromagnetic induction signal to the position detecting device 200. The loop coil of the position detecting device 200 receives the electromagnetic induction signal from the resonant circuit 40R of the electronic pen 1. In contrast thereto, when the switch circuit 407 is in the on-state, the parallel resonant circuit 40R becomes the state in which the resonance operation in response to the AC signal from the position detecting device 200 is prohibited. For this reason, an electromagnetic induction signal is not returned from the parallel resonant circuit 40R to the position detecting device 200, and the loop coil of the position detecting device 200 does not receive the signal from the electronic pen 1.

In this example, the processing control unit 229 of the position detecting device 200 carries out detection of whether or not a received signal from the electronic pen 1 is present the same number of times as the number of bits of additional information, and thereby receives the additional information of a digital signal of these plural bits.

Meanwhile, the control circuit 400 of the electronic pen 1 generates a digital signal of plural bits corresponding to additional information to be transmitted, and on/off-controls the switch circuit 407 in synchronization with transmission and reception of an electromagnetic induction signal between the electronic pen 1 and the position detecting device 200 based on the digital signal of the plural bits. For example, the switch circuit 407 is turned on when the bit of the additional information is "1." In this case, an electromagnetic induction signal is not returned from the electronic pen 1 to the position detecting device 200 as described above. On the other hand, when the bit of the additional information is "0," the switch circuit 407 is turned off. In this case, an electromagnetic induction signal is returned from the electronic pen 1 to the position detecting device 200 as described above.

As a result, the processing control unit 229 of the position detecting device 200 can receive the additional information that is a digital signal by carrying out detection of whether or not a received signal from the electronic pen 1 is present the same number of times as the number of bits of the additional information.

Next, the control circuit 400 monitors change in the writing pressure based on the capacitance of the variable-capacitance capacitor 36C of the writing pressure detecting member 36, and determines whether or not the writing pressure has come not to be applied and disappeared (step S104). When it is determined in the step S104 that the writing pressure is applied and has not disappeared, the control circuit 400 returns the processing to the step S103 and repeats the processing of the step S103 and the subsequent steps.

Furthermore, when it is determined in the step S104 that the writing pressure has come not to be applied and disappeared, the control circuit 400 determines whether or not the disappearance state of the writing pressure has continued for a predetermined time or longer (e.g., 10 seconds or longer) (step S105). When it is determined that the predetermined time or longer has not elapsed, the control circuit 400 returns the processing to the step S103 and repeats the processing of the step S103 and the subsequent steps. When it is determined in the step S105 that the disappearance state of the writing pressure has continued for the predetermined time or longer, the control circuit 400 stops the transmission of the additional information (step S106) and intends protection of security of the additional information. Subsequently in step S106, the control circuit 400 returns the processing to the step S101 and repeats the processing of the step S101 and the subsequent steps.

That the transmission of the additional information is not immediately stopped when it is determined that the writing pressure has come not to be applied and disappeared in the step S104 is based on consideration of the case in which the user temporarily separates the electronic pen 1 from the sensor surface of the position detecting device 200 although continuing input with the sensor surface by the electronic pen 1.

When, in the electronic pen 1, the end part 42a of the knock bar 42 of the knock cam mechanism unit 4 is pressed again and the electronic pen cartridge 3 is housed in the chassis 2 to be set to the protected state, the disappearance state of the writing pressure continues for the predetermined time or longer. Therefore, in the protected state of the electronic pen cartridge 3, the transmission of the additional information from the electronic pen 1 is surely stopped.

Effects of First Embodiment

As described above, in the electronic pen 1 of the above-described first embodiment, the electronic pen cartridge 3 can be housed in the chassis 2 by the knock cam mechanism unit, and the tip of the pen tip part 313 of the core body unit 31 of the electronic pen cartridge 3 can be protruded from the opening of the chassis 2 by operating the knock bar according to need.

Therefore, in the state in which the electronic pen cartridge 3 is housed in the chassis 2, the tip of the pen tip part 313 of the core body unit 31 of the electronic pen cartridge 3 is housed in the chassis 2 and thereby can be set to the protected state. Specifically, in this protected state, the tip of the pen tip part 313 of the core body unit 31 does not protrude to an external environment. Thus, even when the electronic pen 1 is accidentally dropped, the core body unit 31 of the electronic pen cartridge 3 does not directly receive the shock of the drop and is protected.

Furthermore, in this protected state, the additional information such as the identification information of the electronic pen 1 or the electronic pen cartridge 3 is not transmitted to the position detecting device 200 and security of the additional information can be ensured. The state in which the electronic pen cartridge 3 is protected is not the state in which the electronic pen 1 is used by the user. Thus, this state in which transmission of the additional information is stopped also provides an effect that useless signal transmitting can be avoided and the additional information can be transmitted to the position detecting device only when desired.

Furthermore, in the state in which the electronic pen 1 is used in which the knock bar has been pressed by the user and the tip of the pen tip part 313 of the core body unit 31 of the electronic pen cartridge 3 is protruded from the opening of the chassis 2 and a writing pressure is applied to the pen tip part 313, control is carried out to cause the additional information to be sent out to the position detecting device 200. Therefore, according to the electronic pen 1 of the present embodiment, the additional information is sent out to the position detecting device 200 only in the practical used state by the user. Thus, there is an effect that the transmission of the additional information, which ensuring of security is desired, can be kept to a minimum.

As described above, according to the electronic pen of the first embodiment, the problem of ensuring of security of the additional information and avoidance of unnecessary transmission and the problem of protection of the core body can be simultaneously solved.

Furthermore, in the electronic pen of the above-described first embodiment, by making the tubular body unit 32 have a thin shape in addition to the core body unit 31, thickness reduction of the whole of the electronic pen cartridge 3 is enabled. This can realize thickness reduction of the electronic pen 1. In addition, it becomes possible to enable the electronic pen cartridge 3 to have a configuration that allows ensuring of compatibility with a refill of a commercially-available ballpoint pen as in the above-described embodiment.

If the electronic pen cartridge 3 has the configuration that allows ensuring of compatibility with a refill of a commercially-available ballpoint pen, there is a merit that the chassis of the commercially-available ballpoint pen can be diverted as the chassis 2 of the electronic pen 1. That is, the electronic pen 1 can be configured by housing the electronic pen cartridge 3 of the present embodiment instead of a refill of the ballpoint pen in the chassis of the ballpoint pen.

Modification Example of First Embodiment

The method for the switch control circuit 406 of the electronic circuit 34 of the electronic pen 1 to turn on the switch circuit 405 to provide the supply voltage Vcc to the control circuit 400 is not limited to the above-described method.

For example, it is also possible to have a configuration to send a predetermined digital signal from the position detecting device 200 to the electronic pen 1 and cause the switch control circuit 406 that has received this digital signal to generate a switch control signal that turns on the switch circuit 405.

Moreover, in the above-described embodiment, the electronic pen cartridge is provided with the writing pressure detecting member and a threshold is set regarding the pressure detected by the writing pressure detecting member. Furthermore, it is detected that the tip of the pen tip part 313 is protected when the pressure detected by the writing pressure detecting member surpasses the threshold. However, a switch that is turned on according to the pressure applied to the electronic pen cartridge may be provided instead of the writing pressure detecting member, and it may be detected that at least the tip of the pen tip part 313 of the core body unit 31 is protected when this switch is turned on.

Second Embodiment

An electronic pen of the second embodiment is a modification example of the first embodiment. In the above-described first embodiment, only one electronic pen cartridge is housed in the chassis. In the second embodiment, plural electronic pen cartridges are housed in the chassis. Furthermore, one of the plural electronic pen cartridges is selected by a knock mechanism, and the tip of the pen tip part of the selected electronic pen cartridge is protruded from an opening of the chassis on the pen tip side and is used.

As described above, the electronic pen cartridge 3 of the electronic pen 1 of the first embodiment has a configuration that ensures compatibility with the refill 6 of a ballpoint pen. As a commercially-available ballpoint pen, a multicolor ballpoint pen in which refills with different ink colors are mounted exists. The second embodiment provides an electronic pen configured by housing the electronic pen cartridges 3 in a chassis with a configuration similar to that of the chassis of this multicolor ballpoint pen.

Figure 5A:
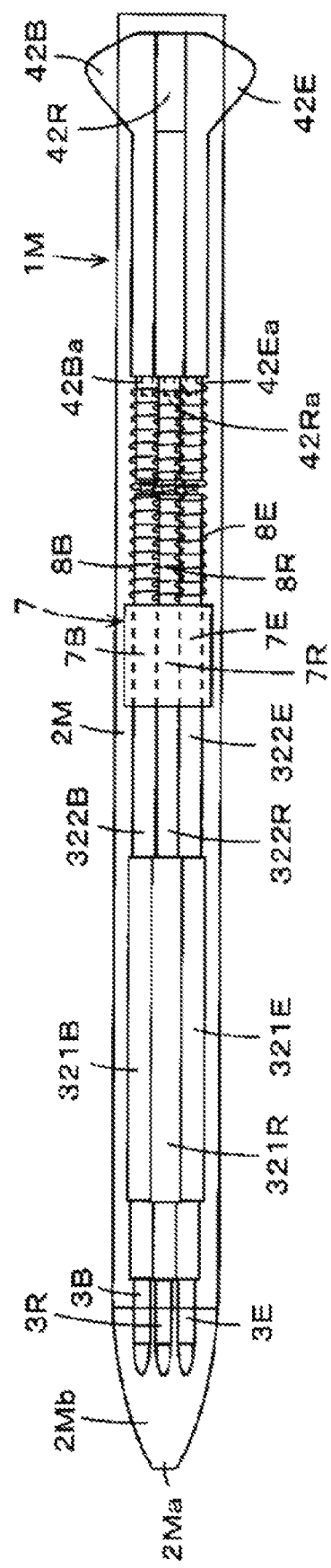
FIGS. 5A, 5B, and 5C depict diagrams showing a configuration example of a second embodiment of the electronic pen according to one aspect of the present invention.

FIG. 5A is a configuration diagram showing the appearance of an electronic pen 1M of the second embodiment. This example of FIG. 5A is also shown as the state in which a chassis 2M of the electronic pen 1M is composed of a transparent synthetic resin and the inside thereof is see-through.

The chassis 2M of the electronic pen 1M has the same configuration as the chassis and knock mechanism of a commercially-available knock-type multicolor ballpoint pen. The chassis and knock mechanism of a commercially-available knock-type multicolor ballpoint pen may be used as they are. In this example, three electronic pen cartridges 3B, 3R, and 3E are housed in the chassis 2M.

An opening 2Ma is formed on one end side of the chassis 2M in the axial center direction. When any of the electronic pen cartridges 3B, 3R, and 3E is slide-moved in the axial center direction by the knock mechanism, the tip of the pen tip part 313 of the core body unit 31 thereof is caused to protrude to the external through the opening 2Ma.

In the state in which the electronic pen cartridges 3B, 3R, and 3E are not slide-moved in the axial center direction by the knock mechanism, the whole of the electronic pen cartridges 3B, 3R, and 3E, including the tips of the pen tip parts 313 of the respective core body units 31, is housed in the hollow part of the chassis 2M and is in the protected state as shown in FIG. 5A. Furthermore, as described above, the tip of the pen tip part 313 of the core body unit 31 of the electronic pen cartridge slide-moved in the axial center direction by the knock mechanism in the electronic pen cartridges 3B, 3R, and 3E is caused to protrude to the external through the opening 2Ma. Therefore, the above-described protection is released in the electronic pen cartridge whose tip of the pen tip part 313 of the core body unit 31 is caused to protrude to the external through the opening 2Ma by the knock mechanism.

These electronic pen cartridges 3B, 3R, and 3E are configured similarly to the electronic pen cartridge 3 of the first embodiment in terms of the outer shape except for that the electronic pen cartridges 3B, 3R, and 3E are formed with the same dimensions as refills of the multicolor ballpoint pen. However, in the electronic pen cartridges 3B, 3R, and 3E of the case of the second embodiment, the second tubular body unit 322 is provided with a switch member that is turned on and off according to movement in the axial center direction by the knock mechanism as will be described later.

In the electronic pen 1M of the second embodiment, as will be described later, based on the state of the switches provided in these electronic pen cartridges 3B, 3R, and 3E, it is detected whether the respective electronic pen cartridges 3B, 3R, and 3E are set to the protected state by the knock mechanism in the electronic pen 1M. The other configurations of the electronic pen cartridges 3B, 3R, and 3E are set similarly to the electronic pen cartridge 3 of the first embodiment.

The knock mechanism of the electronic pen 1M is composed of knock bars 42B, 42R, and 42E having fitting parts 42Ba, 42Ra, and 42Ea to which a respective one of the electronic pen cartridges 3B, 3R, and 3E is fitted, a spring receiving member 7, and coil springs 8B, 8R, and 8E disposed between the fitting parts 42Ba, 42Ra, and 42Ea of a respective one of the electronic pen cartridges 3B, 3R, and 3E and the spring receiving member 7.

The spring receiving member 7 is attached to be fixed at a predetermined position in the axial center direction in the hollow part of the chassis 2M. In the spring receiving member 7, through-holes 7B, 7R, and 7E in which second tubular body units 322B, 322R, and 322E of the electronic pen cartridges 3B, 3R, and 3E are inserted are formed. Each of the electronic pen cartridges 3B, 3R, and 3E is attached to the electronic pen 1M by being inserted in a respective one of the through-holes 7B, 7R, and 7E of the spring receiving member 7 and a respective one of the coil springs 8B, 8R, and 8E and being fitted to the fitting parts 42Ba, 42Ra, and 42Ea of the knock bars 42B, 42R, and 42E.

At the part where the knock bars 42B, 42R, and 42E are housed in the chassis 2M, through-hole slits (diagrammatic representation is omitted in FIG. 5A) in which part of the knock bars 42B, 42R, and 42E is exposed to the outside and in which each of the knock bars 42B, 42R, and 42E is enabled to move in the axial center direction are made.

In the electronic pen 1M, as with a well-known multicolor ballpoint pen, when any of the knock bars 42B, 42R, and 42E is slid to the side of the opening 2Ma and the electronic pen 1M becomes the state in which the tip of the pen tip part 313 of the core body unit 31 of any of the electronic pen cartridges 3B, 3R, and 3E fitted to the knock bar protrudes from the opening 2Ma to the external, a locking part (diagrammatic representation is omitted) of the knock bar 42B, 42R, or 42E engages with an engagement part formed in the hollow part of the chassis 2M and the knock bar becomes the locked state in which the locking part is locked in the state.

Then, when another knock bar is slide-moved to the side of the opening 2Ma in the locked state, the lock of the knock bar in the locked state is released and the knock bar returns to the original state shown in FIG. 5A due to any of the coil springs 8B, 8R, and 8E. Then, the knock bar slide-moved later can become the locked state in which the tip of the pen tip part 313 of the core body unit 31 of any of the electronic pen cartridges 3B, 3R, and 3E fitted to the knock bar protrudes from the opening 2Ma to the external.

Subsequently, the electronic pen cartridge whose tip is protruded from the opening 2Ma can be changed by slide-moving the knock bar similarly. When slide movement of any of the knock bars 42B, 42R, and 42E is stopped in the middle of becoming the locked state, lock release of another knock bar that is currently locked is carried out and the knock bar returns to the protected state of FIG. 5A due to any of the coil springs 8B, 8R, and 8E.

Figure 5B:
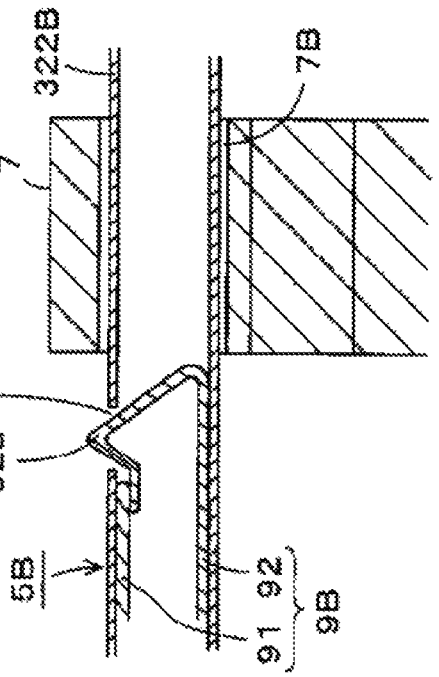
Figure 5C:
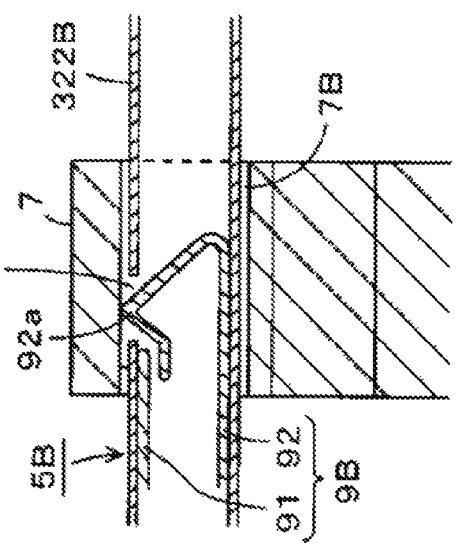

FIGS. 5B and 5C are diagrams for explaining the switches provided in the electronic pen cartridges 3B, 3R, and 3E. FIGS. 5B and 5C show the switch provided in the electronic pen cartridge 3B. The switch is similarly configured for the other electronic pen cartridges 3R and 3E.

Specifically, when the electronic pen cartridge 3B is fitted to the fitting part 42Ba of the knock bar 42B in the non-locked state, a through-hole 322Ba is set just in the circumferential surface of the part of the second tubular body unit 322B housed in the through-hole 7B of the spring receiving member 7. In addition, in the second tubular body unit 322B, a switch member 9B is provided in such a manner that part thereof is exposed from the through-hole 322Ba.

In one embodiment, the switch member 9B is composed of a material having elasticity and having electrical conductivity, specifically an electrically-conductive metal having elasticity. As shown in FIGS. 5B and 5C, the switch member 9B includes a fixed terminal piece 91 fixed to the inner wall surface near the through-hole 322Ba of the second tubular body unit 322B, and a movable terminal piece 92 that can be elastically in contact with the fixed terminal piece 91. The movable terminal piece 92 includes a bent part 92a configured to be capable of assuming the state of being elastically in contact with the fixed terminal piece 91 and the non-contact state, and is attached to the inside of the second tubular body unit 322B in such a manner that part of the bent part 92a can protrude from the through-hole 322Ba.

When the electronic pen cartridge 3B is fitted to the fitting part 42Ba of the knock bar 42B in the non-locked state and is in the protected state in which the whole of the electronic pen cartridge 3B exists in the hollow part of the chassis 2M, the switch member 9B is located just in the through-hole 7B of the spring receiving member 7 as shown in FIG. 5B. Thus, the bent part 92a of the movable terminal piece 92 is elastically displaced to the inside of the second tubular body unit 322B due to the inner wall of the through-hole 7B, which provides the state in which the fixed terminal piece 91 and the movable terminal piece 92 are not in contact with but separated from each other. That is, the switch member 9B is in the off-state.

When the knock bar 42B is slide-moved to the locked state and the tip of the pen tip part 313 of the core body unit 31 of the electronic pen cartridge 3B becomes the unprotected state in which the tip protrudes from the opening 2Ma of the chassis 2M, the switch member 9B becomes the state of being out of the through-hole 7B of the spring receiving member 7 as shown in FIG. 5C. Along with this, part of the bent part 92a of the movable terminal piece 92 is elastically displaced to protrude from the through-hole 322Ba, which provides the state in which the movable terminal piece 92 and the fixed terminal piece 91 are in contact with each other. That is, the switch member 9B becomes the on-state.

Figure 6:
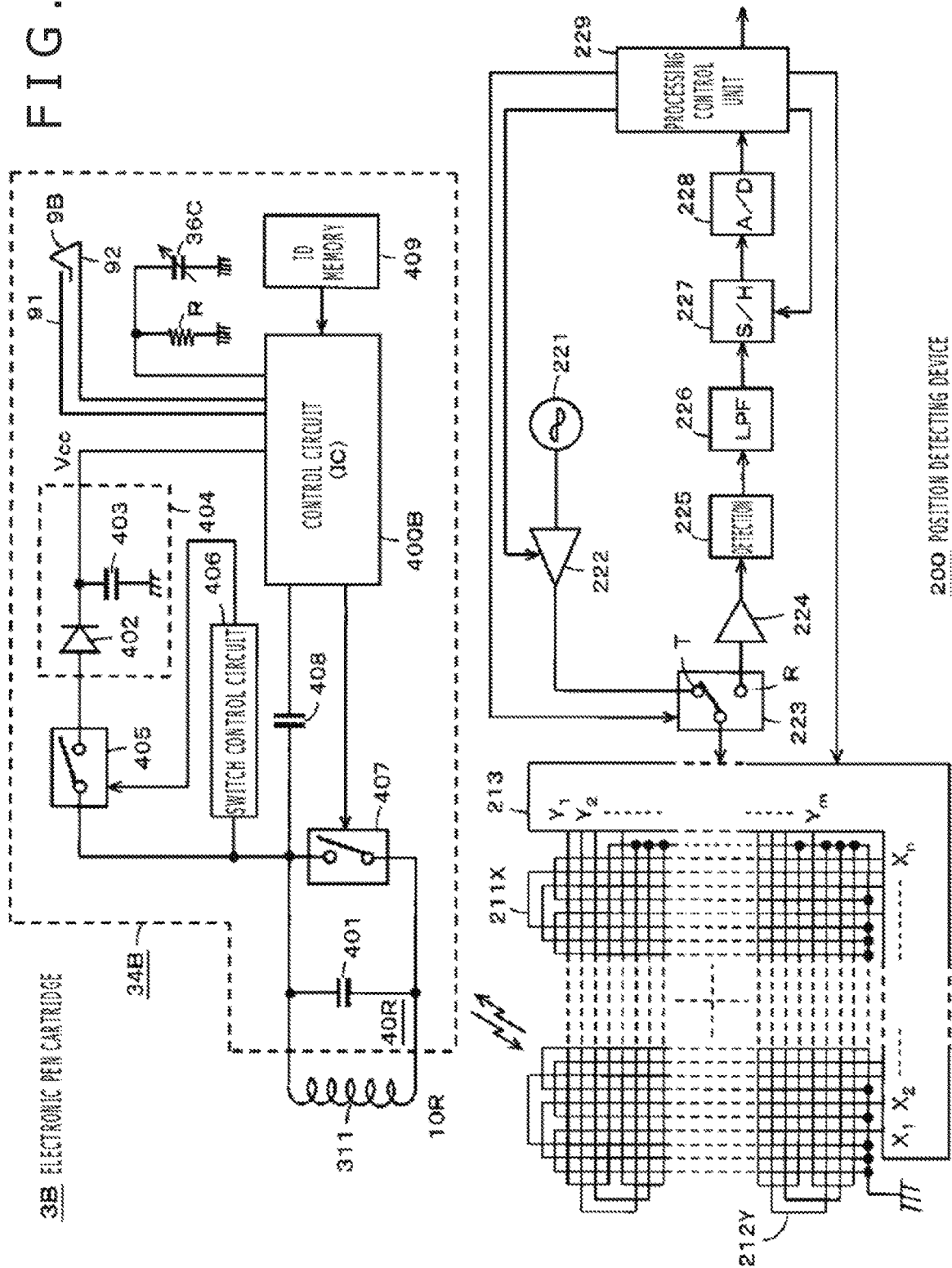
FIG. 6 is a diagram showing a configuration example of an electronic circuit of the second embodiment of the electronic pen according to one aspect of the present invention with the circuit configuration example of the position detecting device.

As shown in FIG. 6, the fixed terminal piece 91 and the movable terminal piece 92 of the switch member 9B are electrically connected to a control circuit 400B of an electronic circuit 34B housed in a first tubular body unit 321B. The control circuit 400B monitors the on/off-state of the switch member 9B to thereby detect whether the electronic pen cartridge 3B is in the protected state in which the whole of the electronic pen cartridge 3B exists in the hollow part of the chassis 2M or in the unprotected state in which the tip of the pen tip part 313 of the core body unit 31 of the electronic pen cartridge 3B protrudes from the opening 2Ma of the chassis 2M by the knock bar 42B.

Similarly, also in the electronic pen cartridge 3R and the electronic pen cartridge 3E, switch members 9R and 9E (diagrammatic representation is omitted) are provided in the second tubular body unit 322R and 322E are connected to control circuits 400R and 400E (diagrammatic representation is omitted) of electronic circuits 34R and 34E (diagrammatic representation is omitted) housed in first tubular body units 321R and 321E.

Although FIG. 6 shows the relationship between the electronic pen cartridge 3B in the electronic pen 1M and the position detecting device 200, it goes without saying that the relationship between the electronic pen cartridges 3R and 3E of the electronic pen 1M and the position detecting device 200 is also similar.

Furthermore, in the case of the present embodiment, the position detecting device used with the electronic pen cartridges 3B, 3R, and 3E has a function of receiving and discriminating identification information transmitted from each of the electronic pen cartridges 3B, 3R, and 3E. That is, the position detecting device of the case of the present embodiment discriminates the difference among the electronic pen cartridges 3B, 3R, and 3E and implements the functions assigned to a respective one of the electronic pen cartridges 3B, 3R, and 3E.

For example, a function of representing a locus (character or graphic) displayed according to the indicated position thereof by black is assigned to the electronic pen cartridge 3B; a function of representing a locus displayed according to the indicated position thereof by red is assigned to the electronic pen cartridge 3R; and a function of erasing a locus indicated and input previously according to the indicated position thereof is assigned to the electronic pen cartridge 3E. In the present embodiment, information to notify these character colors and information to notify the erasure function are stored in the ID memory 409 in addition to the identification information of the electronic pen 1M and the electronic pen cartridges 3B, 3R, and 3E.

The information to notify these character colors and information to notify the erasure function are included, in addition to the identification information of the electronic pen 1M and the electronic pen cartridges 3B, 3R, and 3E, in additional information sent out from the electronic pen cartridges 3B, 3R, and 3E.

The function assigned to the electronic pen cartridge may not only be the display color of the locus according to the indicated position as in this example, but may also be the thickness of the locus, the type of line displayed, such as a solid line, a dotted line, or a one-dot chain line, and so forth.

[Operation of Electronic Pen Cartridges 3B, 3R, and 3E]

Transmission operation of additional information in the electronic pen cartridges 3B, 3R, and 3E of the electronic pen 1M will be described below. However, because the electronic pen cartridges 3B, 3R, and 3E carry out similar operations, description will be made by taking the case of the electronic pen cartridge 3B as an example here. Exchange between each of the electronic pen cartridges 3B, 3R, and 3E and the position detecting device 200 is similar to the case of the first embodiment and therefore description thereof is omitted here.

Figure 7:
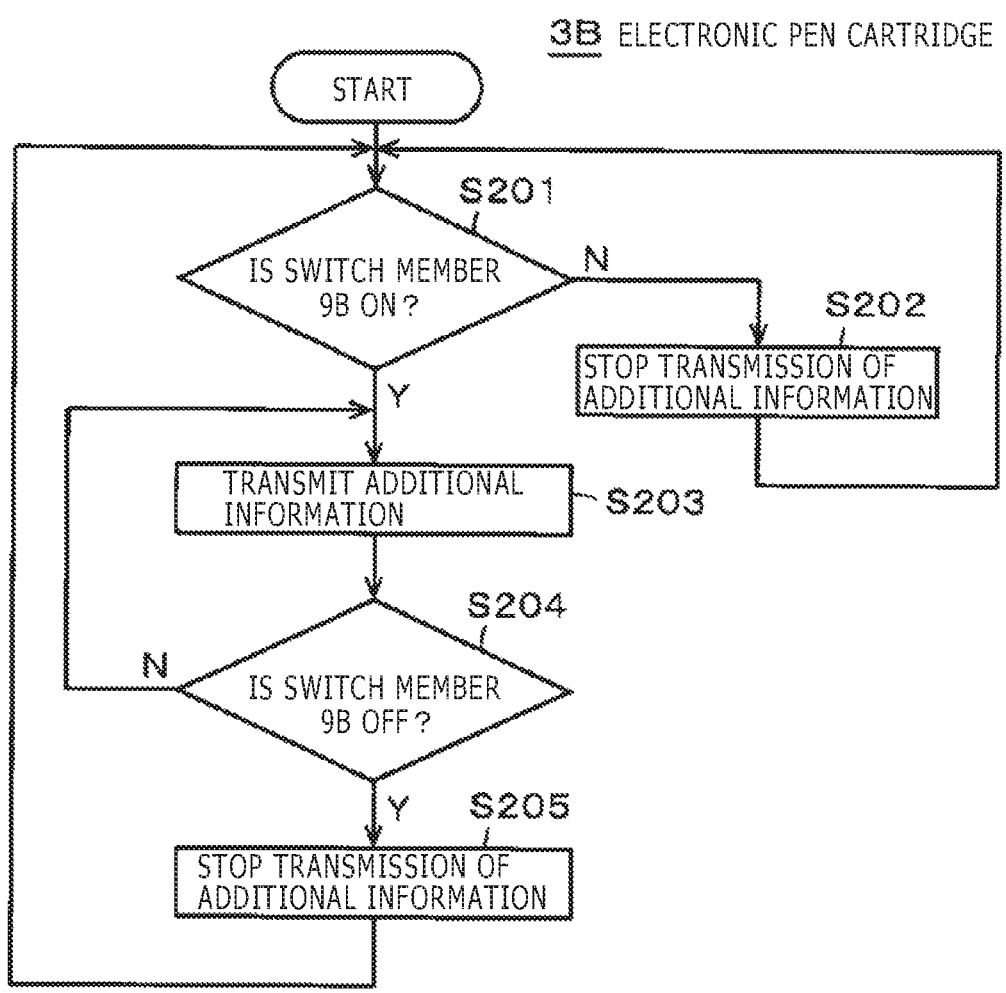
FIG. 7 is a diagram showing a flowchart for explaining operation of the major part of the second embodiment of the electronic pen according to one aspect of the present invention.

FIG. 7 is a flowchart for explaining processing operation of transmission control of additional information in the control circuit 400B of the electronic circuit 34B of the electronic pen cartridge 3B.

The control circuit 400B determines whether or not the switch member 9B has been turned on by knock operation (slide movement operation) of the knock bar 42B by a user (step S201). When it is determined that the switch member 9B is not in the on-state but in the off-state in the step S201, the control circuit 400B deems that the electronic pen cartridge 3B is all housed in the chassis 2M and is in the protected state, and makes the state in which transmission of additional information is stopped and keeps the switch circuit 407 at the off-state constantly (step S202). After the step S202, the control circuit 400B returns the processing to the step S201 and repeats the processing of the step S201 and the subsequent steps.

When it is determined that the switch member 9B is in the on-state in the step S201, the control circuit 400B determines that knock operation (slide movement operation) of the knock bar 42B has been carried out by the user and the tip of the pen tip part 313 of the core body unit 31 of the electronic pen cartridge 3B is in the unprotected state in which the tip protrudes from the opening 2b of the chassis 2, and starts transmission of additional information (step S203).

Specifically, the control circuit 400B transmits writing pressure data to the position detecting device 200 as the additional information. Furthermore, the control circuit 400B reads out the identification information of the electronic pen 1M or the electronic pen cartridge 3B and information to notify the character color from the ID memory 409, and transmits the read-out identification information and information to notify the character color to the position detecting device 200 as the additional information. In the case of the electronic pen cartridge 3E, the erasure function is notified instead of the notification of the character color.

Next, the control circuit 400B determines whether or not the switch member 9B has been turned off (step S204). When it is determined that the switch member 9B has not been turned off, the control circuit 400B returns the processing to the step S203 and repeats the processing of the step S203 and the subsequent steps.

Furthermore, when it is determined that the switch member 9B has been turned off in the step S204, the control circuit 400B determines that the electronic pen cartridge 3B has returned to the protected state in which the whole of the electronic pen cartridge 3B is housed in the hollow part of the chassis 2M by knock operation of the knock bar 42R or 42E of another electronic pen cartridge 3R or 3E, and stops the transmission of the additional information (step S205) to intend protection of security of the additional information. Subsequent to the step S205, the control circuit 400B returns the processing to the step S201 and repeats the processing of the step S201 and the subsequent steps.

As described above, according to the electronic pen 1M of the second embodiment, the problem of ensuring of security of the additional information and the problem of protection of the core body can be simultaneously solved also in the state in which plural electronic pen cartridges are housed in one chassis 2M.

In the above-described second embodiment, the switch members 9B, 9R, and 9E are used as detecting means that detects the protected state and the unprotected state according to slide movement of the electronic pen cartridges 3B, 3R, and 3E in the axial center direction by the knock mechanism. However, the detecting means is not limited thereto.

For example, instead of the switch members, optical sensors may be provided at corresponding positions on the second tubular body unit. In this case, when the electronic pen cartridges 3B, 3R, and 3E are in the protected state, the optical sensors are located in the through-holes 7B, 7R, and 7E of the spring receiving member 7 and are in such a state as not to receive light. On the other hand, when the electronic pen cartridges 3B, 3R, and 3E become the unprotected state, the optical sensors are located outside the through-holes 7B, 7R, and 7E of the spring receiving member 7 and become the state of being capable of receiving light through the transparent chassis 2M. Therefore, each of the control circuit 400B, 400R, and 400E can detect whether the electronic pen cartridge 3B, 3R, or 3E is in the protected state or in the unprotected state by monitoring the level of the light reception output of the optical sensor.

Third Embodiment

The electronic pens 1 and 1M of the above-described first embodiment and second embodiment are the case of the electromagnetic induction coupling system in which transfer of a signal for position detection and additional information is carried out with the position detecting device 200 by electromagnetic induction coupling. However, the electronic pen of the present invention is not limited to the electronic pen of the electromagnetic induction coupling system and may be an electronic pen of the capacitive coupling system that carries out transfer of signals with a position detecting device by capacitive coupling. A third embodiment is an example of an electronic pen of this capacitive coupling system and is an example of a transmission-type electronic pen.

Figure 8:
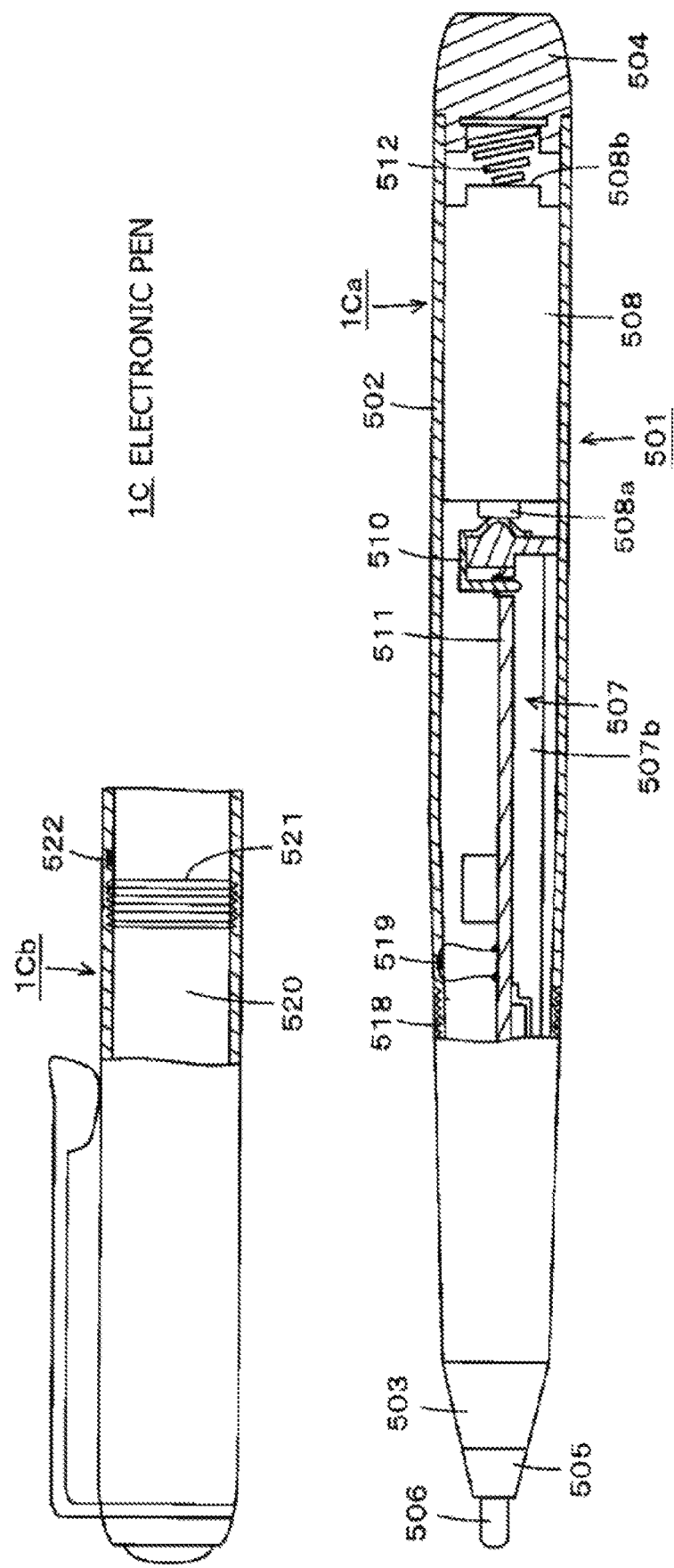
FIG. 8 is a diagram showing a configuration example of a third embodiment of the electronic pen according to one aspect of the present invention.
Figure 9:
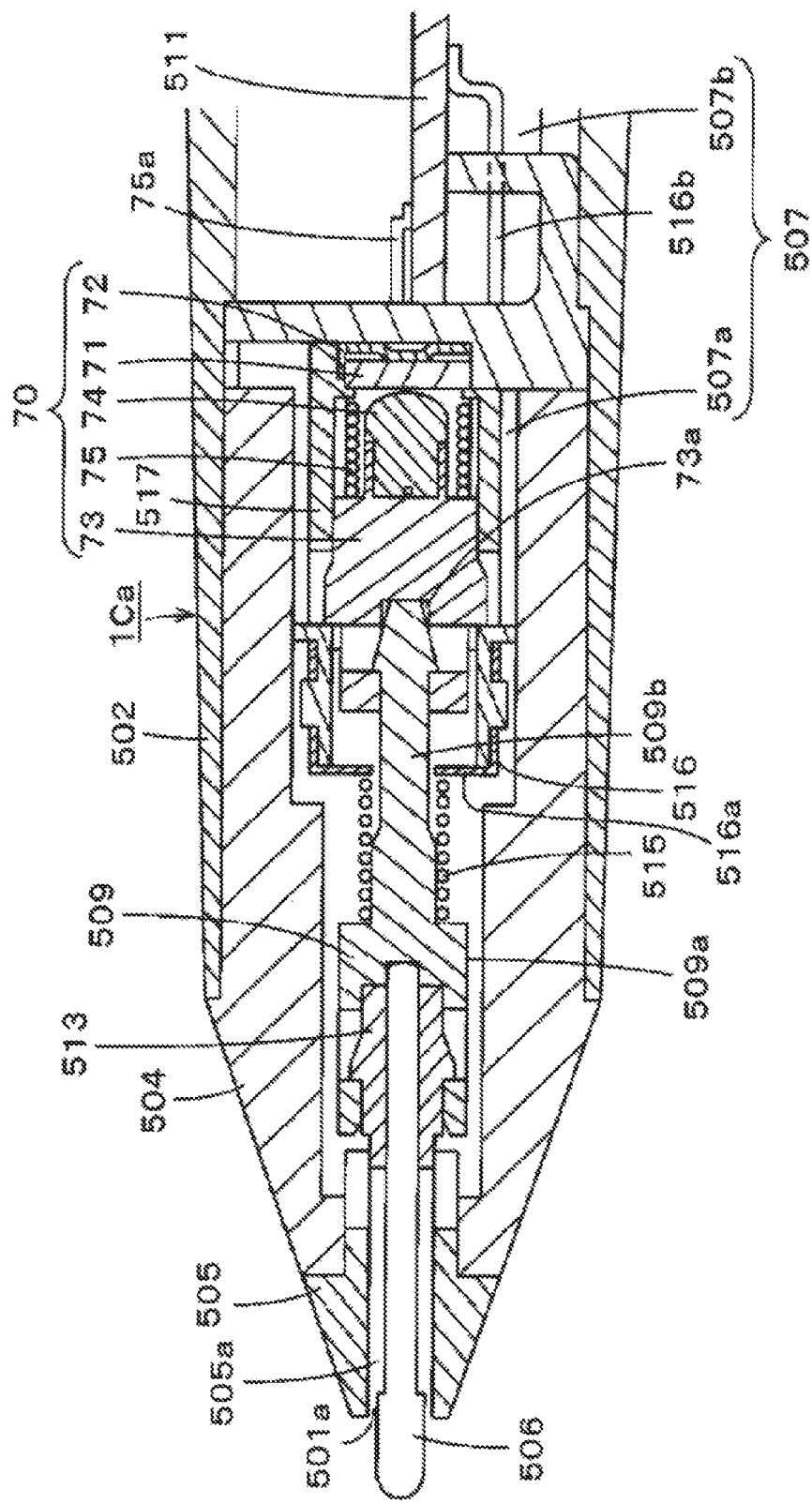
FIG. 9 is a diagram showing part of the configuration example of the third embodiment of the electronic pen according to one aspect of the present invention.
Figure 10:
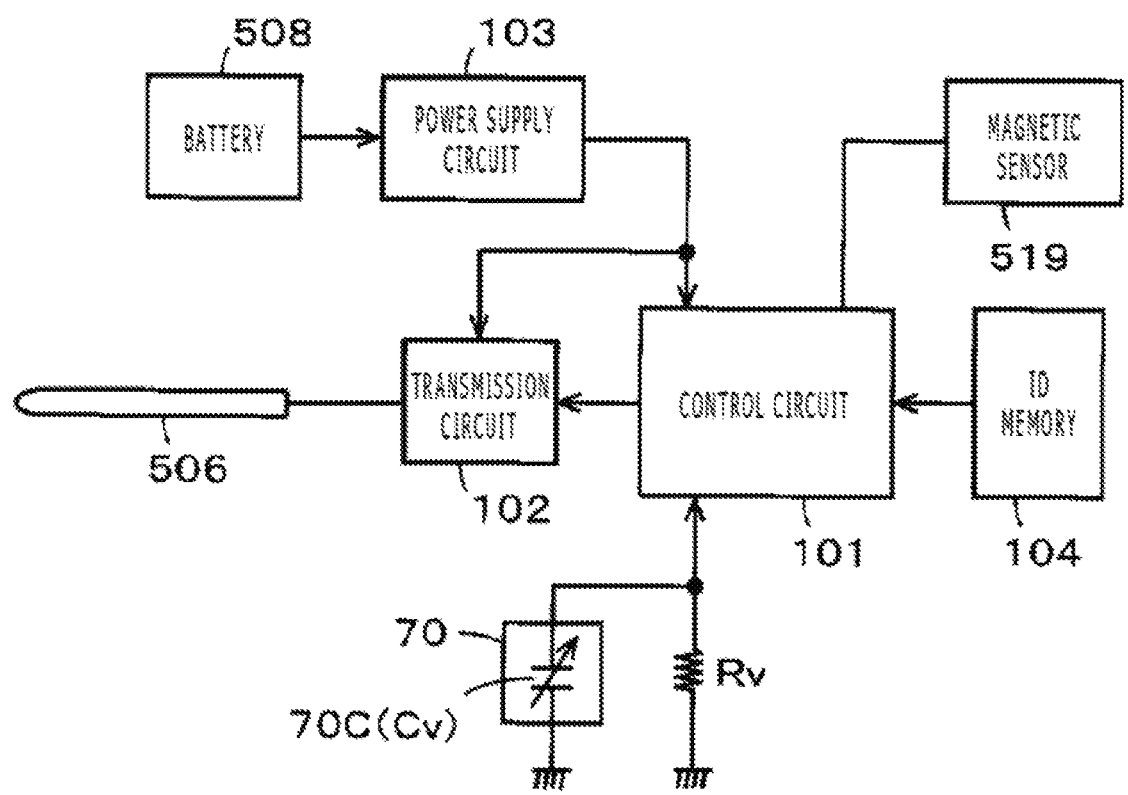
FIG. 10 is a diagram showing a configuration example of an electronic circuit of the third embodiment of the electronic pen according to one aspect of the present invention.

FIG. 8 shows the outline of the mechanical configuration of an electronic pen 1C of the third embodiment. The electronic pen 1C of this example is composed of an electronic pen main body 1Ca and a cap 1Cb that engages with this electronic pen main body in such a manner as to cover the side of a core body 506 serving as the pen tip of the electronic pen main body 1Ca. In FIG. 8, a diagram is made by breaking part of the electronic pen main body 1Ca and the cap 1Cb and showing the inside thereof. Furthermore, an enlarged sectional view for explaining the internal configuration of the part on the pen tip side of the electronic pen main body 1Ca, which is not broken in FIG. 8, is shown in FIG. 9. Moreover, FIG. 10 is a diagram showing an internal circuit configuration example of the electronic pen 1C.

The electronic pen main body 1Ca includes a case 501 that forms a chassis formed into a circular tubular shape elongated in the axial center direction. The case 501 is composed of a case main body 502 composed of an electrically-conductive material, a pen tip sleeve 503 that is joined to the case main body 502 and is composed of an electrically-conductive material, and a lid portion 504 composed of a non-electrically-conductive material.

A pen tip guard member 505 composed of an insulating material is fitted and provided at the end part of the pen tip sleeve 503 on the pen tip side. The core body 506 is composed of an electrically-conductive material, such as a resin into which metal powders are mixed in. As shown in FIG. 9, the core body 506 is inserted into a through-hole 505a of the pen tip guard member 505 from an opening 501a in the state of being freely movable in the axial center direction.

In the hollow part of the case main body 502, a board holder 507, a battery 508, and a core body holder 509 are housed as shown in FIGS. 8 and 9.

The board holder 507 is composed of an insulating resin, such as a liquid crystal polymer, and includes a holding part (hereinafter, referred to as holding part for components for pressure sensing) 507a for a writing pressure detecting module 70 as an example of pressure detecting means and a printed board placement base 507b. The position of the board holder 507 is restricted so that the board holder 507 may be prevented from moving to the side of the core body 506 in the axial center direction in the case main body 502.

A terminal conductor 510 that electrically abuts against a positive terminal 508a of the battery 508 is provided at the end part of the printed board placement base 507b on the side of the lid portion 504. The terminal conductor 510 is electrically connected to a copper foil pattern of a power supply line of a printed board 511. Furthermore, as shown in FIG. 8, a coil spring terminal 512 composed of an electrically-conductive metal that is electrically connected to a negative terminal 508b of the battery 508 and is connected to an earth conductor of the printed board 511 is provided at the press-fitting part of the lid portion 504 into the case main body 502. The earth conductor of the printed board 511 is not connected to the case main body 502 and the pen tip sleeve 503.

In the present embodiment, as shown in FIG. 10, a transmission circuit 102 that generates a signal to be sent out from the core body 506 of the electronic pen 1C, a control circuit 101 that controls activation and the transmission operation state of this transmission circuit 102, a power supply circuit 103, and so forth, and peripheral circuit components thereof are provided on the printed board 511.

The core body holder 509 is composed of an electrically-conductive material and has a shape in which a housing fitting part 509a in which an electrically-conductive elastic member 513 composed of electrically-conductive rubber, for example, is fitted and housed, and a bar-shaped part 509b fitted to the writing pressure detecting module 70 are monolithically formed. The core body 506 is fitted to and held by the core body holder 509 with the intermediary of the electrically-conductive elastic member 513 but is configured to be capable of being withdrawn from the core body holder 509 through pulling by a predetermined force. The bar-shaped part 509b of the core body holder 509 is fitted to a holding member 73, as will be described later, in the writing pressure detecting module 70 in the holding part 507a for components for pressure sensing in the board holder 507.

A coil spring 515 composed of an electrically-conductive material, such as an electrically-conductive metal, is mounted on the bar-shaped part 509b of the core body holder 509. The core body holder 509 is configured to be always biased to the side of the core body 506 relative to the board holder 507 by the coil spring 515.

Furthermore, in the present embodiment, for the board holder 507, a member for an electrical connection is formed by a conductor terminal member 516 provided to straddle the holding part 507a for components for pressure sensing and the coil spring 515 composed of an electrically-conductive material. By this member, for an electrical connection, an electrical connection for signal supply from the transmission circuit 102 of the printed board 511 is realized (see FIG. 9). As shown in FIG. 9, the conductor terminal member 516 is composed of an abutting plate part 516a against which one end of the coil spring 515 abuts and an extending part 516b for connecting the abutting plate part 516a and a copper foil part connected to a signal supply terminal of the transmission circuit 102 of the printed board placement base 507b across the part of the holding part 507a for components for pressure sensing in the board holder 507. A signal from the transmission circuit 102 is supplied to the core body 506 inserted and fitted into the electrically-conductive elastic member 513 via the conductor terminal member 516, the coil spring 515, the core body holder 509, and the electrically-conductive elastic member 513.

The writing pressure detecting module 70 of this example is provided with a configuration of a variable-capacitance capacitor whose capacitance changes according to the writing pressure applied to the core body 506. The writing pressure detecting module 70 in the present embodiment is formed by using, for example, a well-known variable-capacitance capacitor described in Japanese Patent Laid-Open No. 2011-186803.

Components for pressure sensing that form the writing pressure detecting module 70 of this example includes plural components, a dielectric 71, a terminal member 72, the holding member 73, an electrically-conductive member 74, and an elastic member 75, as shown in FIG. 9. These components for pressure sensing that form the writing pressure detecting module 70 are lined up in the axial center direction and are housed in the hollow part of a tubular body 517 of the holding part 507a for components for pressure sensing in the board holder 507.

The variable-capacitance capacitor formed as the writing pressure detecting module 70 of this example is formed through sandwiching of the dielectric 71 between the terminal member 72 that forms one electrode of the variable-capacitance capacitor and the electrically-conductive member 74 that forms the other electrode. The terminal member 72 and the electrically-conductive member 74 are connected to the copper foil pattern of the printed board 511 across a wall part.

Furthermore, the holding member 73 that holds the electrically-conductive member 74 is configured to be movable in the axial center direction in the tubular body 517. Moreover, the holding member 73 is always biased to the core body side by the elastic member 75 formed of a coil spring composed of an electrically-conductive material. The electrically-conductive member 74 is electrically connected to the elastic member 75, and one end 75a of the coil spring that forms the elastic member 75 is connected to the copper foil pattern of the printed board 511 as the other electrode of the variable-capacitance capacitor.

In the holding member 73, a recess 73a is made on the side as the side of the core body 506 in the axial center direction thereof as shown in FIG. 9. The bar-shaped part 509b of the core body holder 509 is press-fitted into the recess 73a of the member 73 and is engaged so as not to fall off to the side of the core body 506.

When a pressure is applied to the tip part of the core body 506, the core body 506 and the core body holder 509 are displaced to the side of the lid portion 504 in the axial center direction according to the pressure. Due to this displacement, the holding member 73 in the holding part 507a for components for pressure sensing is displaced to the side of the dielectric 71 against the elastic biasing force of the elastic member 75. As a result, the electrically-conductive member 74 fitted to the holding member 73 is displaced to the side of the dielectric 71, so that the distance between the electrically-conductive member 74 and the dielectric 71 and the contact area between the electrically-conductive member 74 and the dielectric 71 change according to the pressure applied to the core body 506. Due to this, the capacitance of the variable-capacitance capacitor that forms the writing pressure detecting module 70 changes according to the pressure applied to the core body 506, so that the change in the capacitance is detected by the control circuit 101 and the writing pressure is detected.

Furthermore, in the electronic pen 1C of the third embodiment, the cap 1Cb is put on the side of the core body 506 of the electronic pen main body 1Ca and thereby the tip of the core body 506 protruding from the opening 501a of the case 501 of the electronic pen main body 1Ca is protected. That is, in the third embodiment, the cap 1Cb works as a protection mechanism for the core body 506 protruding from the opening 501a of the electronic pen main body 1Ca.

Moreover, in the third embodiment, the cap 1Cb becomes the state of being locked to the case 501 by screwing to the case 501 of the electronic pen main body 1Ca. For this purpose, as shown in FIG. 8, a screw part 521 is made on the inner wall surface of a hollow part 520 of the cap 1Cb. Meanwhile, a screw part 518 that screws to the screw part 521 of the cap 1Cb is formed in the case main body 502 of the electronic pen main body 1Ca.

Furthermore, the cap 1Cb and the case main body 502 are provided with a permanent magnet 522 and a magnetic sensor 519, respectively, at positions that become the state of being opposed to each other when the cap 1Cb screws to the case main body 502. The magnetic sensor 519 that detects magnetic flux from the permanent magnet 522 forms detecting means about whether or not the tip of the core body of the electronic pen 1C is protected.

Therefore, in the state in which the cap 1Cb is screwed and joined to the case main body 502, the magnetic flux from the permanent magnet 522 provided in the cap 1Cb is detected by the magnetic sensor provided in the case main body 502 and it is detected that the core body 506 is in the protected state. Furthermore, in the state in which the cap 1Cb is released from the joining to the case main body 502 and the core body 506 is exposed to the external, the magnetic flux from the permanent magnet 522 of the cap 1Cb cannot be detected in the magnetic sensor 519 and, thus, it can be detected that the core body 506 is in the unprotected state based on the output of the magnetic sensor 519 at the time.

As shown in FIG. 8, the magnetic sensor 519 is electrically connected to an electrically-conductive pattern of the printed board 511. Specifically, as shown in FIG. 10, the magnetic sensor 519 is connected to the control circuit 101 provided on the printed board 511.

[Operation Control of Electronic Pen 1C of Third Embodiment]

FIG. 10 is a block diagram showing the configuration of an electronic circuit of the major part of the electronic pen 1C of the third embodiment, centered around the above-described control circuit 101 and transmission circuit 102. As shown in the FIG. 10, the battery 508 is connected to the power supply circuit 103. In the power supply circuit 103, the supply voltage of the transmission-type electronic pen 1C of the present embodiment is generated and is supplied to the control circuit 101 and the transmission circuit 102. In this example, the control circuit 101 is formed as an IC.

The transmission circuit 102 internally includes an oscillator (diagrammatic representation is omitted) in this example and generates and outputs a transmission signal based on an oscillation signal from this oscillator. In this example, the transmission signal from the transmission circuit 102 is supplied to the core body 506, which is an electrical conductor, and this transmission signal is transmitted to the position detecting device 200C through the core body 506.

The control circuit 101 is a microcomputer in this example and controls activation of the transmission operation of the transmission circuit 102 and controls the transmission operation state thereof. In this control of the transmission operation state, amplitude control of the oscillation signal from the oscillator included in the transmission circuit 102, control of the intermittence of the oscillation signal, and so forth are included.

Furthermore, the control circuit 101 monitors capacitance Cv of a variable-capacitance capacitor 70C formed of the writing pressure detecting module 70, and detects the value of the writing pressure applied to the core body 506 from the capacitance Cv of the variable-capacitance capacitor 70C similar to the above-described embodiments.

Moreover, an ID memory 104 that stores identification information (ID) of the electronic pen 1C is connected and the magnetic sensor 519 is connected to the control circuit 101 as described above. The control circuit 101 monitors the sensor output of the magnetic sensor 519 and determines whether or not the core body 506 is in the state of being protected by the cap 1Cb.

In the present embodiment, when it is determined that the core body 506 is in the state of being protected by the cap 1Cb from the sensor output of the magnetic sensor 519, the control circuit 101 carries out control to keep additional information composed of writing pressure data and the identification information in the ID memory 104 from being sent out to the position detecting device 200C.

Furthermore, when it is determined that the present state is the state in which the core body 506 is not protected by the cap 1Cb and is exposed, i.e., the state in which the electronic pen 1C is used, from the sensor output of the magnetic sensor 519, the control circuit 101 calculates writing pressure data and reads out the identification information from the ID memory 104 and carries out control to send out additional information composed of them to the position detecting device 200C.

The flow of the above-described transmission control of additional information by the control circuit 101 is similar to the transmission control of additional information by the control circuits 400B, 400R, and 400E of the electronic pen of the second embodiment shown in FIG. 7. However, in the steps corresponding to the step S201 and the step S204, the control circuit 101 determines whether or not the core body 506 is in the state of being protected by the cap 1Cb from the sensor output of the magnetic sensor 519 instead of detecting the on-state or off-state of the switch members 9B, 9R, and 9E.

In the case of the electronic pen 1C of the third embodiment, in steps corresponding to the step S202 and the step S205, the control circuit 101 does not only stop the transmission of additional information but turns the transmission of the transmission signal from the transmission circuit 102 to the stopped state to alleviate battery consumption of the battery 508 as much as possible when determining that the core body 506 is in the protected state.

[Transfer of Signal Between Electronic Pen 1C and Position Detecting Device 200C]

Figure 11:
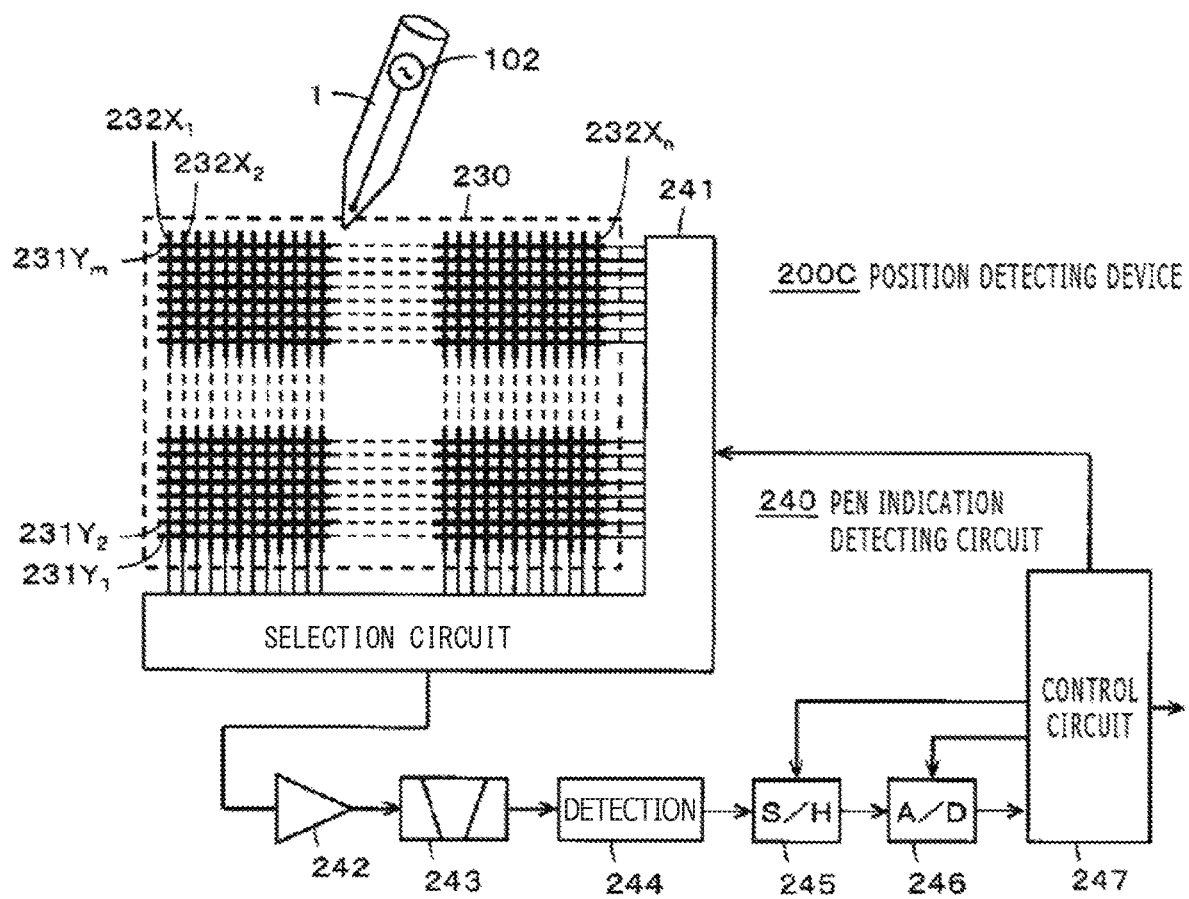
FIG. 11 is a diagram showing a configuration example of a position detecting device used with the third embodiment of the electronic pen according to one aspect of the present invention.

As shown in FIG. 11, the position detecting device 200C that receives a signal from the electronic pen 1C in the third embodiment includes a sensor 230 and a pen indication detecting circuit 240 connected to the sensor 230.

The sensor 230 of the position detecting device 200C of this example has a configuration to receive a signal sent out from the transmission-type electronic pen 1C, detect the position indicated by the electronic pen 1C, and receive additional information by using a sensor pattern formed by a group of first conductors and a group of second conductors intersect.

For example, the group of first conductors is a group obtained by disposing plural first conductors $231Y_1$, $231X_2$, ..., $231Y_m$ (m is an integer equal to or larger than 1) that extend along the horizontal direction (X-axis direction) in the Y-axis direction in parallel, with the plural first conductors $231Y_1$, $231Y_2$, ..., $231Y_m$ separated from each other by predetermined intervals.

Furthermore, the group of second conductors is a group obtained by disposing plural second conductors $232X_1$, $232X_2$, ..., $232X_n$ (n is an integer equal to or larger than 1) that extend along a direction intersecting the extension direction of the first conductors $231Y_1$, $231Y_2$, ..., $231Y_m$, specifically the vertical direction (Y-axis direction) orthogonal to the extension direction in this example, in the X-axis direction in parallel, with the plural second conductors $232X_1$, $232X_2$, ..., $232X_n$ separated from each other by predetermined intervals.

In the following description, regarding the first conductors $231Y_1$, $231Y_2$, ..., $231Y_m$, the conductors will be referred to as the first conductor 231Y when there is no need to discriminate the respective conductors. Similarly, regarding the second conductors $232X_1$, $232X_2$, ..., $232X_n$, the conductors will be referred to as the second conductor 232X when there is no need to discriminate the respective conductors.

The pen indication detecting circuit 240 includes a selection circuit 241 used as an input/output interface with the sensor 230, an amplifying circuit 242, a band-pass filter 243, a detection circuit 244, a sample/hold circuit 245, an AD conversion circuit 246, and a control circuit 247.

The selection circuit 241 selects one conductor from each of the group of first conductors and the group of second conductors based on a control signal from the control circuit 247. The conductors selected by the selection circuit 241 are connected to the amplifying circuit 242, and a signal from the electronic pen 1C is detected by the selected conductors and is amplified by the amplifying circuit 242. The output of the amplifying circuit 242 is supplied to the band-pass filter 243 and only a component of the frequency of the signal transmitted from the electronic pen 1C is extracted.

An output signal of the band-pass filter 243 is subjected to detection by the detection circuit 244. An output signal of the detection circuit 244 is supplied to the sample/hold circuit 245 and is sampled and held at predetermined timing based on a sampling signal from the control circuit 247. Thereafter, the signal is converted to a digital value by the AD conversion circuit 246. The digital data from the AD conversion circuit 246 is read by the control circuit 247 and is processed.

The control circuit 247 operates to send out a control signal to each of the sample/hold circuit 245, the AD conversion circuit 246, and the selection circuit 241 based on a program stored in a read-only memory (ROM) inside the control circuit 247. Furthermore, the control circuit 247 calculates position coordinates on the sensor 230 indicated by the electronic pen 1C from the digital data from the AD conversion circuit 246. Moreover, the control circuit 247 demodulates additional information sent from the electronic pen 1C from the digital data from the AD conversion circuit 246.

Figure 12:
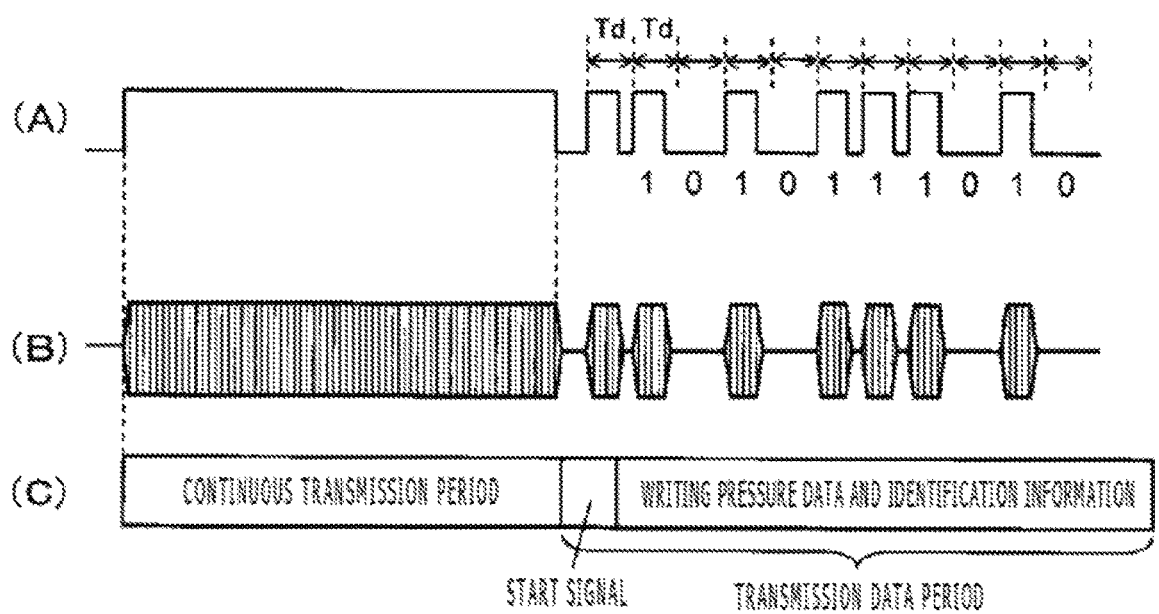
FIG. 12 depicts diagrams for explaining a signal sent out from the third embodiment of the electronic pen according to one aspect of the present invention.

FIG. 12 depicts a timing chart for explaining a signal of a predetermined pattern from the transmission-type electronic pen 1C of the present embodiment, received by the sensor 230 of the position detecting device 200C. In the electronic pen 1C of the present embodiment, as shown in FIG. 10, the control circuit 101 determines whether or not the core body 506 is in the state of being protected by the cap 1Cb based on the sensor output of the magnetic sensor 519, and repeatedly outputs the signal of the predetermined pattern composed of a signal for position detection and additional information from the transmission circuit 102 when determining that the core body 506 is in the unprotected state.

The additional information includes writing pressure data calculated from the capacitance of the variable-capacitance capacitor 70C formed of the writing pressure detecting module 70, and the identification information of the electronic pen 1C read out from the ID memory 104.

FIG. 12(A) shows an example of the control signal from the control circuit 101. As shown in FIG. 12(B), in a certain period during which the high level is kept, the transmission signal from the transmission circuit 102 is continuously transmitted as a burst signal (continuous transmission period in FIG. 12(C).

The length of this continuous transmission period is set to time length in which an indicated position on the sensor 230 by the electronic pen 1C can be detected in the pen indication detecting circuit 240 of the position detecting device 200C. For example, the length is set to time length in which all of the first conductors 231Y and the second conductors 232X can be scanned one or more times, preferably plural times.

In this continuous transmission period, the control circuit 101 detects the value of the writing pressure applied to the core body 506 as a value according to the capacitance of the variable-capacitance capacitor 70C formed of the writing pressure detecting module 70 by a method similar to that described in the first embodiment, and obtains the writing pressure value as a value of plural bits (e.g., 10 bits) (binary code).

Then, as shown in FIG. 12(A), when the continuous transmission period ends, the control circuit 101 carries out ASK modulation of the transmission signal from the transmission circuit 102 by controlling the control signal to the high level or low level at a predetermined cycle (Td). At this time, the control circuit 101 invariably sets the control signal to the high level in the first round of the predetermined cycle (Td) and employs it as a start signal in FIG. 12(C). This start signal is a timing signal for allowing the subsequent data transmission timing to be accurately determined on the side of the position detecting device 200C. It is also possible to utilize the burst signal of the continuous transmission period as the timing signal instead of this start signal.

The control circuit 101 controls the transmission circuit 102 to sequentially transmit writing pressure data of plural bits subsequently to the start signal. In this case, as shown in FIG. 12(A), the control circuit 101 carries out control in such a manner that the control signal is set to the low level and the transmission signal is not sent out when the transmission data (binary code) is "0" and the control signal is set to the high level and the transmission signal is sent out when the transmission data (binary code) is "1."

Furthermore, the control circuit 101 controls the transmission circuit 102 to send out the identification information of the electronic pen 1C, itself, read out from the ID memory 104 as an ASK signal or an OOK signal similarly to the above description subsequent to the writing pressure data.

The control circuit 101 repeatedly transmits the signal of the pattern composed of the continuous transmission period and the transmission data period like the above-described periods at a cycle based on control from the control circuit 101.

In the pen indication detecting circuit 240 of the position detecting device 200C, first the control circuit 247 supplies a selection signal to sequentially select the second conductors $232X_1$ to $232X_n$ to the selection circuit 241 for example. Furthermore, when each of the second conductors $232X_1$ to $232X_n$ is selected, the control circuit 247 reads data output from the AD conversion circuit 246 as a signal level. Then, if the signal level of none of the second conductors $232X_1$ to $232X_n$ reaches a predetermined value, the control circuit 247 determines that the electronic pen 1C does not exist on the sensor 230, and repeats the control to sequentially select the second conductors $232X_1$ to $232X_n$.

If a signal at a level equal to or higher than the predetermined value is detected from any of the second conductors $232X_1$ to $232X_n$, the control circuit 247 stores the number of the second conductor 232X from which the highest signal level is detected and the number of the plural second conductors 232X around it. Then, the control circuit 247 controls the selection circuit 241 to sequentially select the first conductors $231Y_1$ to $231Y_m$, and reads the signal level from the AD conversion circuit 246. At this time, the control circuit 247 stores the numbers of the first conductor 231Y from which the highest signal level is detected and the numbers of the plural first conductors 231Y around it.

Then, the control circuit 247 detects a position on the sensor 230 indicated by the electronic pen 1C from the number of the second conductor 232X and the number of the first conductor 231Y from which the highest signal level is detected and the plural second conductors 232X and the plural first conductors 231Y around them, stored in the above-described manner.

After selecting the last first conductor $231Y_m$ by the selection circuit 241 and ending the detection of the signal level, the control circuit 247 waits for the end of the period of continuous transmission from the electronic pen 1C. When detecting a start signal after the end of the continuous transmission period, the control circuit 247 carries out operation of reading writing pressure data and data on identification information and sends out the writing pressure data and the data on identification information that are read to a host computer or the like to which the position detecting device 200C is connected. Then, the control circuit 247 repeats the above operation.

As described above, according to the electronic pen 1C of the third embodiment, the problem of ensuring of security of the additional information and the problem of protection of the core body can be simultaneously solved also in the transmission-type electronic pen of the capacitive system.

[Modification Example of Electronic Pen of Third Embodiment]

The detection of whether or not the tip of the core body is in the protected state is not limited to the configuration using the magnetic sensor 519. For example, instead of the magnetic sensor 519, an optical sensor may be provided to be capable of receiving light from the external at a position on the case main body 502 hidden by the cap 1Cb when this cap 1Cb engages with the case main body 502. In addition, whether or not the core body 506 is protected may be determined through monitoring of light detection output of this optical sensor by the control circuit 101.

Furthermore, a switch member that is turned on or off when the cap 1Cb engages with the case main body 502 may be provided in the case main body 502 instead of the magnetic sensor 519, and whether or not the core body 506 is protected may be determined through monitoring of the on/off-state of the switch member by the control circuit 101.

Moreover, the switch member may be configured to be turned off when the cap 1Cb engages with the case main body 502 and be turned on when the cap 1Cb is removed from the case main body 502 and the core body 506 is set to the exposed state. In addition, this switch member may be provided between the battery 508 and the power supply circuit 103 and be used as a power supply switch. In this case, only when the cap 1Cb is removed and the core body 506 becomes the exposed state, the switch member is turned on and the voltage of the battery 508 is supplied to the power supply circuit 103 and the supply voltage is provided to the control circuit 101 and the transmission circuit 102. Then, the control circuit 101 controls the transmission circuit 102 to start transmission of a signal for position detection and additional information. That is, in this case, the control circuit 101 does not need to monitor the on/off-state of the switch member but determines the presence/absence of supply of power based on the on/off-state of the switch member as the detection result of the protected state of the core body 506 by the protection mechanism to carry out control of transmission of the additional information based on it.

Furthermore, the pen tip does not need to be formed monolithically with the core body 506 and may be deposited on or joined to the tip of the core main body or may be formed by two-color molding. In this case, the electrically-conductive pen tip is electrically connected to a signal generating circuit through the core main body for example. Alternatively, if the core main body is also composed of an electrically-conductive material, it suffices that the core main body is electrically connected to the signal generating circuit. Furthermore, if the core main body is composed of an insulator, such as a resin, the pen tip and the signal generating circuit can be electrically connected by depositing a conductor film on the resin surface or providing a penetrating electrical conductor that penetrates the inside of the resin and electrically connecting the electrically-conductive film or penetrating electrical conductor to the signal generating circuit.

Fourth Embodiment

The fourth embodiment is a modification example of the electronic pen of the capacitive coupling system in the third embodiment. The electronic pen 1C of the above-described third embodiment includes a signal generating circuit (oscillation circuit) and has the configuration in which a signal is sent out from the core body 506. In contrast thereto, in an electronic pen 1D of the capacitive coupling system in the fourth embodiment, a signal from a sensor of a position detecting device is received and a signal obtained by signal enhancement of the received signal, such as amplification, is returned to the sensor of the position detecting device. A technique relating to transfer of signals by the electronic pen 1D with the sensor is disclosed, for example, in detail in Japanese Patent Laid-Open No. 2012-221304.

The electronic pen 1D of the fourth embodiment wirelessly communicates additional information, such as data of the writing pressure applied to the core body and identification information of the electronic pen, to a position detecting device by a different channel from a signal for position detection through a wireless communication circuit. The wireless communication circuit is configured by a wireless communication circuit of a short-distance wireless communication standard, such as the Bluetooth (registered trademark) standard.

Furthermore, a configuration in which a cap is engaged with the electronic pen main body is similar to that of the above-described third embodiment. Also in the present embodiment, detection of the state in which the core body is protected by the cap and the state in which the cap is removed and the core body is not protected is carried out by the magnetic sensor for detecting the attachment and detachment of the cap similarly to the third embodiment.

Figure 13A:
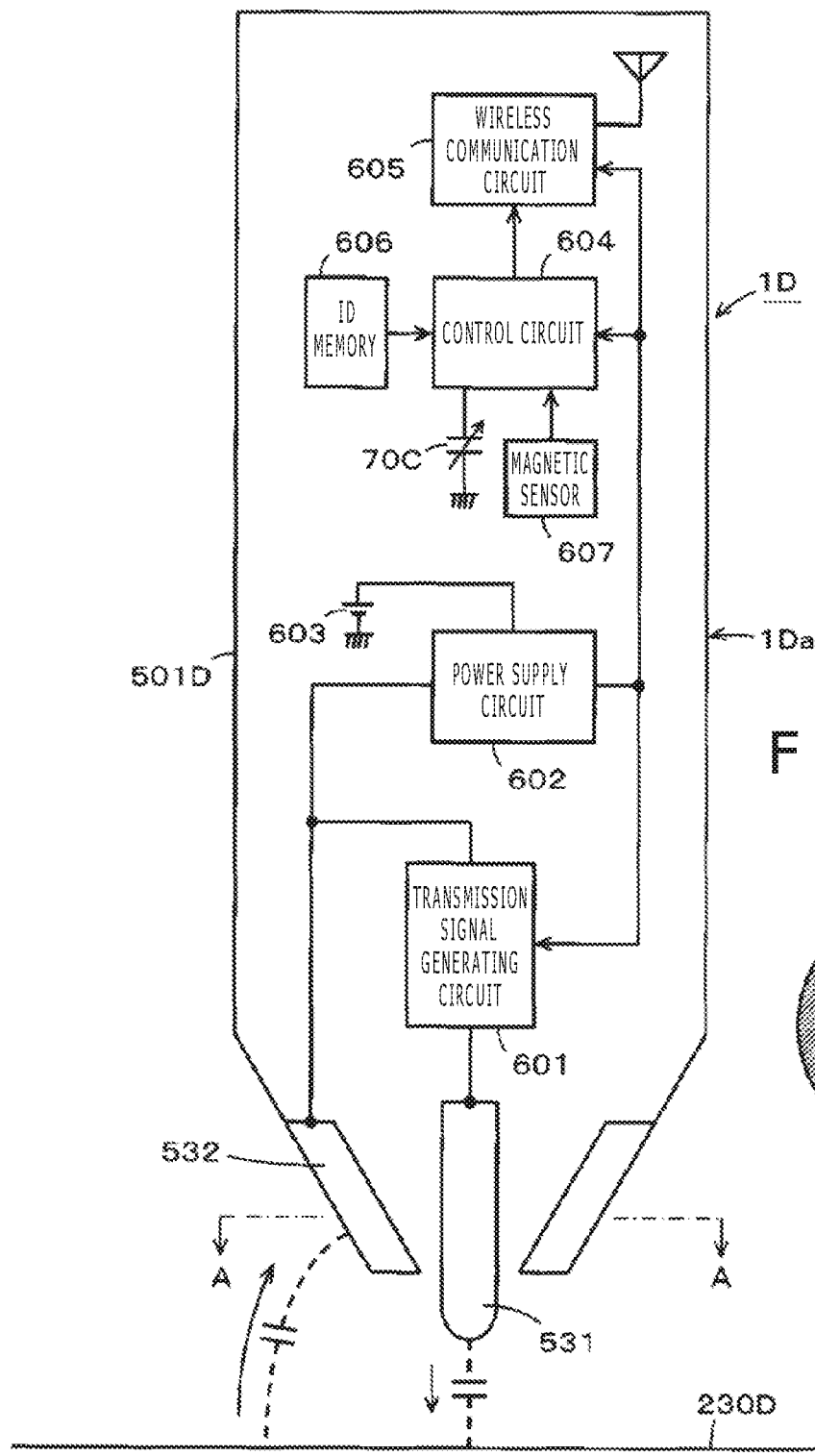
FIGS. 13A and 13B depict diagrams for explaining a configuration example of a fourth embodiment of the electronic pen according to one aspect of the present invention.
Figure 13B:
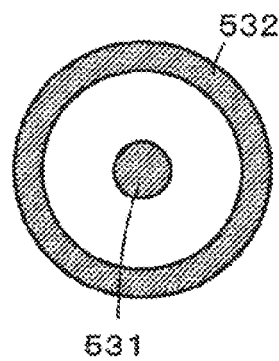

FIG. 13A is a diagram for explaining the electronic circuit configuration on the side of the electronic pen main body engaged with the cap in the fourth embodiment. FIG. 13B is a sectional view along A-A in FIG. 13A and is a sectional view of a pen tip part of an electronic pen main body 1Da of the electronic pen 1D of the fourth embodiment.

In the electronic pen 1D of the fourth embodiment, an electrically-conductive core body 531 is disposed in such a manner that the tip protrudes from an opening part of a case 501D. In addition, a peripheral electrode 532 that surrounds the core body 531 is disposed. The peripheral electrode 532 may be disposed on the outer circumferential side surface of the case 501D or may be disposed on the inner wall surface of the case 501D. However, a configuration in which the core body 531 and the peripheral electrode 532 are insulated from each other is made.

In the electronic pen 1D of the fourth embodiment, an AC signal sent out from a sensor 230D of a position detecting device is received by the peripheral electrode 532 by capacitive coupling and the received signal is supplied to a transmission signal generating circuit 601 and a power supply circuit 602. The power supply circuit 602 uses the AC signal received from the sensor 230D as a start trigger and generates a supply voltage from a voltage from a battery 603.

Then, the power supply circuit 602 provides the generated supply voltage to the transmission signal generating circuit 601 and the control circuit 604 and moreover to a wireless communication circuit 605.

The transmission signal generating circuit 601 enhances the AC signal from the sensor 230D received by the peripheral electrode 532 through amplification or the like and then returns the signal after the enhancement to the sensor 230D through the core body 531 by capacitive coupling.

Furthermore, the control circuit 604 monitors sensor output of a magnetic sensor 607 that sends out the sensor output according to attachment or detachment of the cap to or from the electronic pen main body 1Da, and carries out control to stop transmission of additional information from the wireless communication circuit 605 when it is determined that the core body 531 is in the state of being protected by the cap.

Moreover, when it is determined that the core body 531 is in the state of being not protected by the cap from the sensor output of the magnetic sensor 607, the control circuit 604 reads out identification information of the electronic pen 1D from an ID memory 606 and transmits the identification information as the additional information to a position detecting device 200D through the wireless communication circuit 605. Furthermore, the control circuit 604 calculates data of the value of the writing pressure applied to the core body 531 from the value of the capacitance of a variable-capacitance capacitor 70C formed of a writing pressure detecting module 70 that detects the writing pressure applied to the core body 531, and transmits the writing pressure data as the additional information to the position detecting device 200D through the wireless communication circuit 605.

Also in the electronic pen 1D of the fourth embodiment, in the state in which the core body 531 is protected by the cap, the transmission of the additional information by wireless communication is stopped and security is ensured.

Fifth Embodiment

The electronic pens 1 and 1M of the above-described first embodiment and second embodiment are the system in which the tip of the core body unit of the electronic pen cartridge is protruded and retracted based on the knock system. However, a system in which the tip of the core body unit of the electronic pen cartridge is protruded and retracted based on a rotation system may be employed.

Figure 14A:
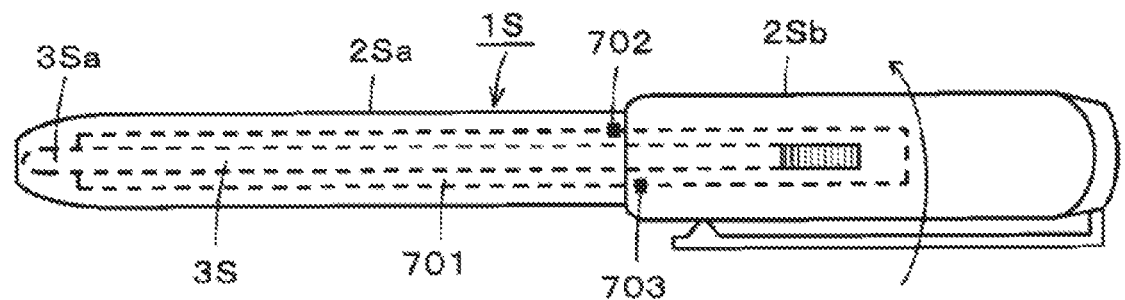
FIGS. 14A and 14B depict diagrams for explaining a configuration example of a fifth embodiment of the electronic pen according to one aspect of the present invention.
Figure 14B:
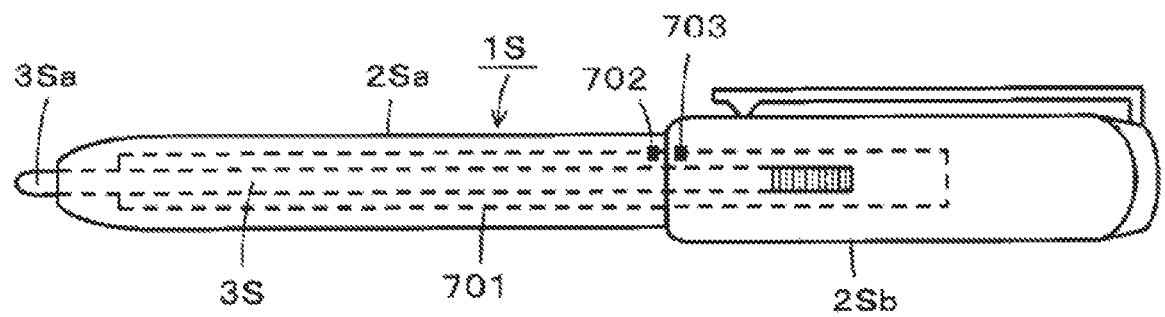

FIGS. 14A and 14B are diagrams for explaining a configuration example of an electronic pen 1S of a rotation system in a fifth embodiment. The electronic pen 1S of the present embodiment is composed of an electronic pen main body unit 2Sa and a cap unit 2Sb rotatably fitted to the electronic pen main body unit 2Sa. The electronic pen main body unit 2Sa forms a first member and the cap unit 2Sb forms a second member.

The electronic pen main body unit 2Sa includes a protruding-retracting mechanism 701 that protrudes and retracts a tip 3Sa of the pen tip of an electronic pen cartridge 3S based on the rotation system. The electronic pen cartridge 3S is inserted in the protruding-retracting mechanism 701 and is held to the protruding-retracting mechanism 701. The cap unit 2Sb has a configuration with which the cap unit 2Sb can rotate relative to the electronic pen main body unit 2Sa and is fitted to the protruding-retracting mechanism 701 to add rotation to this protruding-retracting mechanism 701.

The electronic pen cartridge 3S of the electronic pen 1S of the fifth embodiment has a different form from the above-described electronic pen cartridges 3, 3B, 3R, and 3E and has a fitting part that is inserted in the protruding-retracting mechanism 701 and is fixed to this protruding-retracting mechanism.

Furthermore, in the electronic pen 1S of the fifth embodiment, as shown in FIGS. 14A and 14B, the electronic pen main body unit 2Sa and the cap unit 2Sb are provided with a magnetic sensor 702 and a permanent magnet 703, respectively, at positions that become the state of being close to each other due to the rotation of the cap unit 2Sb. In addition, the magnetic sensor 702 is connected to a control circuit that is provided in an electronic circuit in the electronic pen main body unit 2Sa and controls transmission of additional information similarly to the third embodiment.

Moreover, in the electronic pen 1S of the fifth embodiment, as shown in FIG. 14A, in the state in which the whole of the electronic pen cartridge 3S is housed in the electronic pen main body unit 2Sa and the tip 3Sa is protected, the permanent magnet 703 and the magnetic sensor 702 become the state of being comparatively remote. Therefore, magnetic flux from the permanent magnet 703 is not detected in the magnetic sensor 702 and the sensor output thereof becomes a low level.

When the cap unit 2Sb is rotated from this state and the state in which the tip 3Sa of the electronic pen cartridge 3S protrudes from the electronic pen main body unit 2Sa and is unprotected is obtained, the permanent magnet 703 and the magnetic sensor 702 become the state of being close to each other. Therefore, the magnetic flux from the permanent magnet 703 is detected in the magnetic sensor 702 and the sensor output thereof becomes a high level.

The control circuit provided in the electronic circuit in the electronic pen main body unit 2Sa monitors the sensor output of the magnetic sensor 702. When the sensor output is at the low level, the control circuit determines that the tip 3Sa of the electronic pen cartridge 3S is in the protected state, and carries out control to stop the transmission of the additional information. Furthermore, when the sensor output is at the high level, the control circuit determines that the tip 3Sa of the electronic pen cartridge 3S is not protected, and carries out control to send out the additional information.

It goes without saying that effects similar to those of the above-described embodiments are achieved also in the fifth embodiment.

The detection of whether or not the tip of the electronic pen cartridge is in the protected state is not limited to the configuration using the magnetic sensor 702. For example, instead of the magnetic sensor 702, a switch member that is turned on or off when the cap unit 2Sb rotates from the state of FIG. 14A to the state of FIG. 14B may be provided in the electronic pen main body unit 2Sa. In addition, whether or not the tip of the electronic pen cartridge is protected may be determined through monitoring of the on/off-state of the switch member by the control circuit.

Other Modification Examples

In the first embodiment and the second embodiment, the additional information is transmitted with the signal for position detection to the sensor of the position detecting device through the resonant circuit provided near the core body. However, the additional information, in the first embodiment and the second embodiment, may be transmitted to the position detecting device through a wireless communication circuit separately from the signal for position detection similar to the fourth embodiment. Furthermore, also in the third embodiment, the signal for position detection may be transmitted to the position detecting device through the electrically-conductive core body and the additional information may be transmitted to the position detecting device through a wireless communication circuit.

In addition, in the case of transmitting the additional information to the position detecting device by using a wireless communication circuit, all kinds of additional information may be transmitted through the wireless communication circuit. Alternatively, for example, identification information of the electronic pen or the electronic pen cartridge in the additional information may be transmitted through the wireless communication circuit, and writing pressure data may be transmitted with the signal for position detection to the position detecting device.

Moreover, in the above-described embodiments, the detection result of the detecting means that detects whether or not at least the tip of the core body is in the state of being protected by the protection mechanism is supplied to the control circuit and the control circuit controls whether or not to allow transmission of the additional information. However, it is also possible to control whether or not to allow transmission of the additional information based on the detection result of the detecting means without going through the control circuit. For example, in the case of transmitting the additional information through a wireless communication circuit, whether or not to allow the transmission of the additional information can be controlled by making the configuration to control the operation and non-operation of the wireless communication circuit based on the detection output of the detecting means.

Furthermore, in the above-described second embodiment to fifth embodiment, the determination of whether or not at least the tip of the core body is protected may be based on the output of the writing pressure detecting means that detects the writing pressure applied to the core body.

Moreover, the electronic pen of the present invention may have a configuration that does not include the control circuit, itself, controlling whether or not to allow transmission of the additional information based on the detection result of the detecting means detecting whether or not at least the tip of the core body is in the state of being protected by the protection mechanism. For example, a configuration may be employed in which the electronic pen cartridge that forms the electronic pen main body unit includes a circuit in which a variable-capacitance capacitor formed as a writing pressure detecting member is connected in parallel to the resonant circuit composed of a coil and a capacitor.

In this case, in a position detecting device, the writing pressure is detected based on change in the frequency of a signal from the electronic pen (phase change is also available). Therefore, when the electronic pen is in the state in which the tip of the core body is protected by the protection mechanism, the writing pressure applied to the pen tip is not detected and information on the writing pressure, as an example of the additional information, is not transmitted to the position detecting device. Then, when the electronic pen becomes the state in which the tip of the core body is not protected by the protection mechanism, the state in which a writing pressure can be applied to the tip of the core body is obtained. When a writing pressure is actually applied, the frequency of the resonant circuit changes according to the writing pressure and, as the frequency resulting from the change, information on the writing pressure as the additional information is transmitted to the position detecting device.

In the above-described embodiments, the writing pressure detecting means uses the variable-capacitance capacitor that varies the capacitance by a mechanical movable part according to the writing pressure. However, writing pressure detecting means in which the variable-capacitance capacitor is formed as a micro electro mechanical system (MEMS) chip formed of a semiconductor device may be used. Furthermore, it goes without saying that the writing pressure detecting means may be writing pressure detecting means that does not detect change in the capacitance but varies an inductance value or a resistance value.

The invention claimed is:

1. An electronic pen configured to transmit signals to a sensor of a position detecting device, the electronic pen comprising:
  a core body;
  a signal transmitter which, in operation, transmits a signal for position detection and a signal including information about the electronic pen to the sensor of the position detecting device; and
  a protector which, in operation, sets at least a tip of the core body between a protected state and an unprotected state, at least the tip of the core body being unexposed to an environment external to the electronic pen in the protected state, at least the tip of the core body being exposed to the environment in the unprotected state, wherein
  in response to at least the tip of the core body being in the unprotected state, the signal for position detection and the signal including the information are transmitted from the signal transmitter to the sensor of the position detecting device, and
  in response to at least the tip of the core body being in the protected state, the signal for position detection is transmitted from the signal transmitter and the signal including the information is not transmitted from the signal transmitter.

2. The electronic pen according to claim 1, comprising:
  a control circuit which, in operation, controls transmission of the signal for position detection and the signal including the information in response to at least the tip of the core body being in the unprotected state, and controls non-transmission of the signal including the information in response to at least the tip of the core body being in the protected state.

3. The electronic pen according to claim 1, comprising:
  a writing pressure detector, wherein
  at least the tip of the core body is determined to be in the unprotected state in response to the writing pressure detector detecting writing pressure applied to the core body.

4. The electronic pen according to claim 1, comprising:
  a first chassis having a tubular shape in which an electronic pen main body is disposed, the electronic pen main body including the core body and the signal transmitter; and
  a second chassis having a tubular shape and including a fitting part, the electronic pen main body being fitted to the fitting part.

5. The electronic pen according to claim 4, wherein
  the protector includes a knock mechanism that switches at least the tip of the core body between the protected state and the unprotected state,
  the entire core body is disposed in the second chassis in the protected state, and
  at least the tip of the core body protrudes from the second chassis into the environment in the unprotected state.

6. The electronic pen according to claim 5, comprising:
  a switch that is turned on and off in conjunction with operation of the knock mechanism.

7. The electronic pen according to claim 1, comprising:
  a tubular chassis that holds the core body in a state in which at least the tip of the core body is protruded from one opening; and
  a cap that engages with the tubular chassis to cover the tubular chassis from a side on which the tip of the core body is protruded.

8. The electronic pen according to claim 7, wherein at least the tip of the core body is in the protected state when the cap is engaged with the tubular chassis.

9. The electronic pen according to claim 1, wherein the protector includes:
  a first member that has a tubular shape and includes a protruding-retracting mechanism that protrudes and retracts the tip of the core body from one opening based on a rotation mechanism; and
  a second member that is rotatable to communicate rotation to the protruding-retracting mechanism of the first member.

10. The electronic pen according to claim 9, wherein at least the tip of the core body is determined to be in the unprotected state in response to detecting rotation of the second member relative to the first member.

11. The electronic pen according to claim 1, wherein the information about the electronic pen includes identification information of the electronic pen.

12. The electronic pen according to claim 1, comprising:
a coil wound around a magnetic core positioned adjacent to the core body; and
a resonant circuit including a capacitor connected in parallel to the coil, wherein
transmission and reception of signals are carried out in the resonant circuit by electromagnetic induction coupling between the resonant circuit and the sensor of the position detecting device.

13. The electronic pen according to claim 1, comprising:
a signal generating circuit which, in operation, generates the signal for position detection and the signal including the information, wherein
the core body has electrical conductivity, and
the signal transmitter transmits the signals from the signal generating circuit via the core body to the sensor of the position detecting device by capacitive coupling.

14. The electronic pen according to claim 1, wherein
the core body has electrical conductivity and a peripheral electrode is provided around the core body,
a signal from the sensor of the position detecting device is received through one of the core body and the peripheral electrode by capacitive coupling, and
a signal generated based on the signal from the sensor is transmitted from the other of the core body and the peripheral electrode to the sensor of the position detecting device by capacitive coupling.

15. The electronic pen according to claim 1, wherein the signal transmitter includes a wireless communication circuit that transmits part or all of the information to the position detecting device through a wireless communication path.

16. A method, comprising:
providing an electronic pen including a core body, wherein at least a tip of the core body is settable between a protected state and an unprotected state, at least the tip of the core body being unexposed to an environment external to the electronic pen in the protected state, at least the tip of the core body being exposed to the environment in the unprotected state;
transmitting, from the electronic pen, a signal for position detection and a signal including information about the electronic pen when at least the tip of the core body is in the unprotected state; and
transmitting, from the electronic pen, the signal for position detection and not transmitting, from the electronic pen, the signal including the information when at least the tip of the core body is in the protected state.

17. The method of claim 16, comprising:
determining whether pressure is applied to the tip of the core body;
determining that at least the tip of the core body is in the protected state in response to determining that pressure is applied to the tip of the core body; and
determining that at least the tip of the core body is in the unprotected state in response to determining that no pressure is applied to the tip of the core body.

18. The method of claim 16, comprising:
determining whether a switch is in an on state or an off state;
determining that at least the tip of the core body is in the protected state in response to determining that the switch is in the off state; and
determining that at least the tip of the core body is in the unprotected state in response to determining that the switch is in the on state.

19. The method of claim 16, comprising:
determining whether a cap is engaged with a main body of the electronic pen;
determining that at least the tip of the core body is in the protected state in response to determining that the cap is engaged with the main body of the electronic pen; and
determining that at least the tip of the core body is in the unprotected state in response to determining that the cap is not engaged with the main body of the electronic pen.

20. An electronic pen configured to transmit signals to a sensor of a position detecting device, the electronic pen comprising:
a core body having electrical conductivity;
a peripheral electrode provided around the core body;
a signal transmitter which, in operation, transmits a signal for position detection and a signal including information about the electronic pen to the sensor of the position detecting device; and
a protector which, in operation, sets at least a tip of the core body between a protected state and an unprotected state, at least the tip of the core body being unexposed to an environment external to the electronic pen in the protected state, at least the tip of the core body being exposed to the environment in the unprotected state, wherein
in response to at least the tip of the core body being in the unprotected state, the signal for position detection and the signal including the information are transmitted from the signal transmitter to the sensor of the position detecting device,
in response to at least the tip of the core body being in the protected state, the signal including the information is not transmitted from the signal transmitter,
a signal from the sensor of the position detecting device is received through one of the core body and the peripheral electrode by capacitive coupling, and
a signal generated based on the signal from the sensor of the position detecting device is transmitted from the other of the core body and the peripheral electrode to the sensor of the position detecting device by capacitive coupling.

21. The electronic pen according to claim 20, comprising:
a writing pressure detector, wherein
at least the tip of the core body is determined to be in the unprotected state in response to the writing pressure detector detecting writing pressure applied to the core body.

* * * * *